US009204203B2

(12) United States Patent
Brockmann et al.

(10) Patent No.: US 9,204,203 B2
(45) Date of Patent: Dec. 1, 2015

(54) REDUCTION OF LATENCY IN VIDEO DISTRIBUTION NETWORKS USING ADAPTIVE BIT RATES

(75) Inventors: Ronald A. Brockmann, Utrecht (NL); Anuj Dev, Hilversum (NL); Gerrit Hiddink, Hilversum (NL); Joshua Dahlby, Scotts Valley, CA (US); Lena Y. Pavlovskaia, Cupertino, CA (US)

(73) Assignee: ActiveVideo Networks, Inc., San Jose, CA (US)

( * ) Notice: Subject to any disclaimer, the term of this patent is extended or adjusted under 35 U.S.C. 154(b) by 309 days.

(21) Appl. No.: 13/438,617

(22) Filed: Apr. 3, 2012

(65) Prior Publication Data

US 2012/0257671 A1   Oct. 11, 2012

Related U.S. Application Data

(60) Provisional application No. 61/473,085, filed on Apr. 7, 2011.

(51) Int. Cl.
*H04N 7/26* (2006.01)
*H04N 21/647* (2011.01)
(Continued)

(52) U.S. Cl.
CPC ....... *H04N 21/64753* (2013.01); *H04N 19/115* (2014.11); *H04N 19/164* (2014.11); *H04N 21/64769* (2013.01); *H04N 21/6587* (2013.01)

(58) Field of Classification Search
CPC .......... H04N 7/26159; H04N 7/26164; H04N 7/26186; H04N 21/6437; H04N 19/164; H04N 19/115; H04N 21/2343; H04N 21/2385; H04N 19/147; H04N 21/6131; H04N 21/6373; H04N 21/6375; H04N 21/64753; H04N 21/64769; H04N 21/6587; H04L 1/0009; H04L 5/0046; H04L 67/32; H04L 1/0006; H04L 43/0864; H04L 47/2416; H04L 47/801; H04W 72/08; H04W 28/04; H04W 72/085
USPC ......................................................... 375/240
See application file for complete search history.

(56) References Cited

U.S. PATENT DOCUMENTS 3,889,050 A   6/1975 Thompson
3,934,079 A   1/1976 Barnhart
(Continued)

FOREIGN PATENT DOCUMENTS

AT        191599 T     4/2000
AT        198969 T     2/2001
(Continued)

OTHER PUBLICATIONS

Handley et al. "TCP Congestion Window Validation" RFC 2861. (Jun. 2000) Network Working Group.*
(Continued)

*Primary Examiner* — Sath V Perungavoor
*Assistant Examiner* — Nathnael Aynalem
(74) *Attorney, Agent, or Firm* — Morgan, Lewis & Bockius LLP

(57) ABSTRACT

Systems and methods are provided for reducing and controlling playback latency in an unmanaged, buffered data network. A delay cost function is determined, the function representing the effect of playback latency on end user experience. An encoder transmits audiovisual data through the network to a client device. Network latency is measured, and the delay cost function is evaluated to establish an encoding bitrate for the encoder. The encoding of the audiovisual data is altered in response to dynamic network conditions, thereby controlling end-to-end playback latency of the system, which is represented by the playout length of data buffered between the encoder and the client device.

28 Claims, 9 Drawing Sheets

(51) Int. Cl.
*H04N 21/6587* (2011.01)
*H04N 19/115* (2014.01)
*H04N 19/164* (2014.01)

(56) References Cited

U.S. PATENT DOCUMENTS

| | | |
|---|---|---|
| 3,997,718 A | 12/1976 | Ricketts et al. |
| 4,002,843 A | 1/1977 | Rackman |
| 4,032,972 A | 6/1977 | Saylor |
| 4,077,006 A | 2/1978 | Nicholson |
| 4,081,831 A | 3/1978 | Tang et al. |
| 4,107,734 A | 8/1978 | Percy et al. |
| 4,107,735 A | 8/1978 | Frohbach |
| 4,145,720 A | 3/1979 | Weintraub et al. |
| 4,168,400 A | 9/1979 | de Couasnon et al. |
| 4,186,438 A | 1/1980 | Benson et al. |
| 4,222,068 A | 9/1980 | Thompson |
| 4,245,245 A | 1/1981 | Matsumoto et al. |
| 4,247,106 A | 1/1981 | Jeffers et al. |
| 4,253,114 A | 2/1981 | Tang et al. |
| 4,264,924 A | 4/1981 | Freeman |
| 4,264,925 A | 4/1981 | Freeman et al. |
| 4,290,142 A | 9/1981 | Schnee et al. |
| 4,302,771 A | 11/1981 | Gargini |
| 4,308,554 A | 12/1981 | Percy et al. |
| 4,350,980 A | 9/1982 | Ward |
| 4,367,557 A | 1/1983 | Stern et al. |
| 4,395,780 A | 7/1983 | Gohm et al. |
| 4,408,225 A | 10/1983 | Ensinger et al. |
| 4,450,477 A | 5/1984 | Lovett |
| 4,454,538 A | 6/1984 | Toriumi |
| 4,466,017 A | 8/1984 | Banker |
| 4,471,380 A | 9/1984 | Mobley |
| 4,475,123 A | 10/1984 | Dumbauld et al. |
| 4,484,217 A | 11/1984 | Block et al. |
| 4,491,983 A | 1/1985 | Pinnow et al. |
| 4,506,387 A | 3/1985 | Walter |
| 4,507,680 A | 3/1985 | Freeman |
| 4,509,073 A | 4/1985 | Baran et al. |
| 4,523,228 A | 6/1985 | Banker |
| 4,533,948 A | 8/1985 | McNamara et al. |
| 4,536,791 A | 8/1985 | Campbell et al. |
| 4,538,174 A | 8/1985 | Gargini et al. |
| 4,538,176 A | 8/1985 | Nakajima et al. |
| 4,553,161 A | 11/1985 | Citta |
| 4,554,581 A | 11/1985 | Tentler et al. |
| 4,555,561 A | 11/1985 | Sugimori et al. |
| 4,562,465 A | 12/1985 | Glaab |
| 4,567,517 A | 1/1986 | Mobley |
| 4,573,072 A | 2/1986 | Freeman |
| 4,591,906 A | 5/1986 | Morales-Garza et al. |
| 4,602,279 A | 7/1986 | Freeman |
| 4,614,970 A | 9/1986 | Clupper et al. |
| 4,616,263 A | 10/1986 | Eichelberger |
| 4,625,235 A | 11/1986 | Watson |
| 4,627,105 A | 12/1986 | Ohashi et al. |
| 4,633,462 A | 12/1986 | Stifle et al. |
| 4,670,904 A | 6/1987 | Rumreich |
| 4,682,360 A | 7/1987 | Frederiksen |
| 4,695,880 A | 9/1987 | Johnson et al. |
| 4,706,121 A | 11/1987 | Young |
| 4,706,285 A | 11/1987 | Rumreich |
| 4,709,418 A | 11/1987 | Fox et al. |
| 4,710,971 A | 12/1987 | Nozaki et al. |
| 4,718,086 A | 1/1988 | Rumreich et al. |
| 4,732,764 A | 3/1988 | Hemingway et al. |
| 4,734,764 A | 3/1988 | Pocock et al. |
| 4,748,689 A | 5/1988 | Mohr |
| 4,749,992 A | 6/1988 | Fitzemeyer et al. |
| 4,750,036 A | 6/1988 | Martinez |
| 4,754,426 A | 6/1988 | Rast et al. |
| 4,760,442 A | 7/1988 | O'Connell et al. |
| 4,763,317 A | 8/1988 | Lehman et al. |
| 4,769,833 A | 9/1988 | Farleigh et al. |
| 4,769,838 A | 9/1988 | Hasegawa |
| 4,789,863 A | 12/1988 | Bush |
| 4,792,849 A | 12/1988 | McCalley et al. |
| 4,801,190 A | 1/1989 | Imoto |
| 4,805,134 A | 2/1989 | Calo et al. |
| 4,807,031 A | 2/1989 | Broughton et al. |
| 4,816,905 A | 3/1989 | Tweedy et al. |
| 4,821,102 A | 4/1989 | Ichikawa et al. |
| 4,823,386 A | 4/1989 | Dumbauld et al. |
| 4,827,253 A | 5/1989 | Maltz |
| 4,827,511 A | 5/1989 | Masuko |
| 4,829,372 A | 5/1989 | McCalley et al. |
| 4,829,558 A | 5/1989 | Welsh |
| 4,847,698 A | 7/1989 | Freeman |
| 4,847,699 A | 7/1989 | Freeman |
| 4,847,700 A | 7/1989 | Freeman |
| 4,848,698 A | 7/1989 | Newell et al. |
| 4,860,379 A | 8/1989 | Schoeneberger et al. |
| 4,864,613 A | 9/1989 | Van Cleave |
| 4,876,592 A | 10/1989 | Von Kohorn |
| 4,889,369 A | 12/1989 | Albrecht |
| 4,890,320 A | 12/1989 | Monslow et al. |
| 4,891,694 A | 1/1990 | Way |
| 4,901,367 A | 2/1990 | Nicholson |
| 4,903,126 A | 2/1990 | Kassatly |
| 4,905,094 A | 2/1990 | Pocock et al. |
| 4,912,760 A | 3/1990 | West, Jr. et al. |
| 4,918,516 A | 4/1990 | Freeman |
| 4,920,566 A | 4/1990 | Robbins et al. |
| 4,922,532 A | 5/1990 | Farmer et al. |
| 4,924,303 A | 5/1990 | Brandon et al. |
| 4,924,498 A | 5/1990 | Farmer et al. |
| 4,937,821 A | 6/1990 | Boulton |
| 4,941,040 A | 7/1990 | Pocock et al. |
| 4,947,244 A | 8/1990 | Fenwick et al. |
| 4,961,211 A | 10/1990 | Tsugane et al. |
| 4,963,995 A | 10/1990 | Lang |
| 4,975,771 A | 12/1990 | Kassatly |
| 4,989,245 A | 1/1991 | Bennett |
| 4,994,909 A | 2/1991 | Graves et al. |
| 4,995,078 A | 2/1991 | Monslow et al. |
| 5,003,384 A | 3/1991 | Durden et al. |
| 5,008,934 A | 4/1991 | Endoh |
| 5,014,125 A | 5/1991 | Pocock et al. |
| 5,027,400 A | 6/1991 | Baji et al. |
| 5,051,720 A | 9/1991 | Kittirutsunetorn |
| 5,051,822 A | 9/1991 | Rhoades |
| 5,057,917 A | 10/1991 | Shalkauser et al. |
| 5,058,160 A | 10/1991 | Banker et al. |
| 5,060,262 A | 10/1991 | Bevins, Jr et al. |
| 5,077,607 A | 12/1991 | Johnson et al. |
| 5,083,800 A | 1/1992 | Lockton |
| 5,088,111 A | 2/1992 | McNamara et al. |
| 5,093,718 A | 3/1992 | Hoarty et al. |
| 5,109,414 A | 4/1992 | Harvey et al. |
| 5,113,496 A | 5/1992 | McCalley et al. |
| 5,119,188 A | 6/1992 | McCalley et al. |
| 5,130,792 A | 7/1992 | Tindell et al. |
| 5,132,992 A | 7/1992 | Yurt et al. |
| 5,133,009 A | 7/1992 | Rumreich |
| 5,133,079 A | 7/1992 | Ballantyne et al. |
| 5,136,411 A | 8/1992 | Paik et al. |
| 5,142,575 A | 8/1992 | Farmer et al. |
| 5,144,448 A | 9/1992 | Hornbaker, III et al. |
| 5,155,591 A | 10/1992 | Wachob |
| 5,172,413 A | 12/1992 | Bradley et al. |
| 5,191,410 A | 3/1993 | McCalley et al. |
| 5,195,092 A | 3/1993 | Wilson et al. |
| 5,208,665 A | 5/1993 | McCalley et al. |
| 5,220,420 A | 6/1993 | Hoarty et al. |
| 5,230,019 A | 7/1993 | Yanagimichi et al. |
| 5,231,494 A | 7/1993 | Wachob |
| 5,236,199 A | 8/1993 | Thompson, Jr. |
| 5,247,347 A | 9/1993 | Litteral et al. |
| 5,253,341 A | 10/1993 | Rozmanith et al. |
| 5,262,854 A | 11/1993 | Ng |
| 5,262,860 A | 11/1993 | Fitzpatrick et al. |
| 5,303,388 A | 4/1994 | Kreitman et al. |
| 5,319,455 A | 6/1994 | Hoarty et al. |
| 5,319,707 A | 6/1994 | Wasilewski et al. |

(56) References Cited

U.S. PATENT DOCUMENTS

| | | |
|---|---|---|
| 5,321,440 A | 6/1994 | Yanagihara et al. |
| 5,321,514 A | 6/1994 | Martinez |
| 5,351,129 A | 9/1994 | Lai |
| 5,355,162 A | 10/1994 | Yazolino et al. |
| 5,359,601 A | 10/1994 | Wasilewski et al. |
| 5,361,091 A | 11/1994 | Hoarty et al. |
| 5,371,532 A | 12/1994 | Gelman et al. |
| 5,404,393 A | 4/1995 | Remillard |
| 5,408,274 A | 4/1995 | Chang et al. |
| 5,410,343 A | 4/1995 | Coddington et al. |
| 5,410,344 A | 4/1995 | Graves et al. |
| 5,412,415 A | 5/1995 | Cook et al. |
| 5,412,720 A | 5/1995 | Hoarty |
| 5,418,559 A | 5/1995 | Blahut |
| 5,422,674 A | 6/1995 | Hooper et al. |
| 5,422,887 A | 6/1995 | Diepstraten et al. |
| 5,442,389 A | 8/1995 | Blahut et al. |
| 5,442,390 A | 8/1995 | Hooper et al. |
| 5,442,700 A | 8/1995 | Snell et al. |
| 5,446,490 A | 8/1995 | Blahut et al. |
| 5,469,283 A | 11/1995 | Vinel et al. |
| 5,469,431 A | 11/1995 | Wendorf et al. |
| 5,471,263 A | 11/1995 | Odaka |
| 5,481,542 A | 1/1996 | Logston et al. |
| 5,485,197 A | 1/1996 | Hoarty |
| 5,487,066 A | 1/1996 | McNamara et al. |
| 5,493,638 A | 2/1996 | Hooper et al. |
| 5,495,283 A | 2/1996 | Cowe |
| 5,495,295 A | 2/1996 | Long |
| 5,497,187 A | 3/1996 | Banker et al. |
| 5,517,250 A | 5/1996 | Hoogenboom et al. |
| 5,526,034 A | 6/1996 | Hoarty et al. |
| 5,528,281 A | 6/1996 | Grady et al. |
| 5,537,397 A | 7/1996 | Abramson |
| 5,537,404 A | 7/1996 | Bentley et al. |
| 5,539,449 A | 7/1996 | Blahut et al. |
| RE35,314 E | 8/1996 | Logg |
| 5,548,340 A | 8/1996 | Bertram |
| 5,550,578 A | 8/1996 | Hoarty et al. |
| 5,557,316 A | 9/1996 | Hoarty et al. |
| 5,559,549 A | 9/1996 | Hendricks et al. |
| 5,561,708 A | 10/1996 | Remillard |
| 5,570,126 A | 10/1996 | Blahut et al. |
| 5,570,363 A | 10/1996 | Holm |
| 5,579,143 A | 11/1996 | Huber |
| 5,581,653 A | 12/1996 | Todd |
| 5,583,927 A | 12/1996 | Ely et al. |
| 5,587,734 A | 12/1996 | Lauder et al. |
| 5,589,885 A | 12/1996 | Ooi |
| 5,592,470 A | 1/1997 | Rudrapatna et al. |
| 5,594,507 A | 1/1997 | Hoarty |
| 5,594,723 A | 1/1997 | Tibi |
| 5,594,938 A | 1/1997 | Engel |
| 5,596,693 A | 1/1997 | Needle et al. |
| 5,600,364 A | 2/1997 | Hendricks et al. |
| 5,600,573 A | 2/1997 | Hendricks et al. |
| 5,608,446 A | 3/1997 | Carr et al. |
| 5,617,145 A | 4/1997 | Huang et al. |
| 5,621,464 A | 4/1997 | Teo et al. |
| 5,625,404 A | 4/1997 | Grady et al. |
| 5,630,757 A | 5/1997 | Gagin et al. |
| 5,631,693 A | 5/1997 | Wunderlich et al. |
| 5,631,846 A | 5/1997 | Szurkowski |
| 5,632,003 A | 5/1997 | Davidson et al. |
| 5,649,283 A | 7/1997 | Galler et al. |
| 5,668,592 A | 9/1997 | Spaulding, II |
| 5,668,599 A | 9/1997 | Cheney et al. |
| 5,708,767 A | 1/1998 | Yeo et al. |
| 5,710,815 A | 1/1998 | Ming et al. |
| 5,712,906 A | 1/1998 | Grady et al. |
| 5,740,307 A | 4/1998 | Lane |
| 5,742,289 A | 4/1998 | Naylor et al. |
| 5,748,234 A | 5/1998 | Lippincott |
| 5,754,941 A | 5/1998 | Sharpe et al. |
| 5,786,527 A | 7/1998 | Tarte |
| 5,790,174 A | 8/1998 | Richard, III et al. |
| 5,802,283 A | 9/1998 | Grady et al. |
| 5,812,665 A | 9/1998 | Hoarty et al. |
| 5,812,786 A | 9/1998 | Seazholtz et al. |
| 5,815,604 A | 9/1998 | Simons et al. |
| 5,818,438 A | 10/1998 | Howe et al. |
| 5,821,945 A | 10/1998 | Yeo et al. |
| 5,822,537 A | 10/1998 | Katseff et al. |
| 5,828,371 A | 10/1998 | Cline et al. |
| 5,844,594 A | 12/1998 | Ferguson |
| 5,845,083 A | 12/1998 | Hamadani et al. |
| 5,862,325 A | 1/1999 | Reed et al. |
| 5,864,820 A | 1/1999 | Case |
| 5,867,208 A | 2/1999 | McLaren |
| 5,883,661 A | 3/1999 | Hoarty et al. |
| 5,903,727 A | 5/1999 | Nielsen |
| 5,903,816 A | 5/1999 | Broadwin et al. |
| 5,905,522 A | 5/1999 | Lawler |
| 5,907,681 A | 5/1999 | Bates et al. |
| 5,917,822 A | 6/1999 | Lyles et al. |
| 5,946,352 A | 8/1999 | Rowlands et al. |
| 5,952,943 A | 9/1999 | Walsh et al. |
| 5,959,690 A | 9/1999 | Toebes et al. |
| 5,961,603 A | 10/1999 | Kunkel et al. |
| 5,963,203 A | 10/1999 | Goldberg et al. |
| 5,966,163 A | 10/1999 | Lin et al. |
| 5,978,756 A | 11/1999 | Walker et al. |
| 5,982,445 A | 11/1999 | Eyer et al. |
| 5,990,862 A | 11/1999 | Lewis |
| 5,995,146 A | 11/1999 | Rasmussen |
| 5,995,488 A | 11/1999 | Kalkunte et al. |
| 5,999,970 A | 12/1999 | Krisbergh et al. |
| 6,014,416 A | 1/2000 | Shin et al. |
| 6,021,386 A | 2/2000 | Davis et al. |
| 6,031,989 A | 2/2000 | Cordell |
| 6,034,678 A | 3/2000 | Hoarty |
| 6,049,539 A | 4/2000 | Lee et al. |
| 6,049,831 A | 4/2000 | Gardell et al. |
| 6,052,555 A | 4/2000 | Ferguson |
| 6,055,314 A | 4/2000 | Spies et al. |
| 6,055,315 A | 4/2000 | Doyle et al. |
| 6,064,377 A | 5/2000 | Hoarty et al. |
| 6,078,328 A | 6/2000 | Schumann et al. |
| 6,084,908 A | 7/2000 | Chiang et al. |
| 6,100,883 A | 8/2000 | Hoarty |
| 6,108,625 A | 8/2000 | Kim |
| 6,131,182 A | 10/2000 | Beakes et al. |
| 6,141,645 A | 10/2000 | Chi-Min et al. |
| 6,141,693 A | 10/2000 | Perlman et al. |
| 6,144,698 A | 11/2000 | Poon et al. |
| 6,167,084 A | 12/2000 | Wang et al. |
| 6,169,573 B1 | 1/2001 | Sampath-Kumar et al. |
| 6,177,931 B1 | 1/2001 | Alexander et al. |
| 6,182,072 B1 | 1/2001 | Leak et al. |
| 6,184,878 B1 | 2/2001 | Alonso et al. |
| 6,192,081 B1 | 2/2001 | Chiang et al. |
| 6,198,822 B1 | 3/2001 | Doyle et al. |
| 6,205,582 B1 | 3/2001 | Hoarty |
| 6,226,041 B1 | 5/2001 | Florencio et al. |
| 6,236,730 B1 | 5/2001 | Cowieson et al. |
| 6,243,418 B1 | 6/2001 | Kim |
| 6,253,238 B1 | 6/2001 | Lauder et al. |
| 6,256,047 B1 | 7/2001 | Isobe et al. |
| 6,266,369 B1 | 7/2001 | Wang et al. |
| 6,266,684 B1 | 7/2001 | Kraus et al. |
| 6,275,496 B1 | 8/2001 | Burns et al. |
| 6,292,194 B1 | 9/2001 | Powell, III |
| 6,305,020 B1 | 10/2001 | Hoarty et al. |
| 6,317,151 B1 | 11/2001 | Ohsuga et al. |
| 6,317,885 B1 | 11/2001 | Fries |
| 6,349,284 B1 | 2/2002 | Park et al. |
| 6,385,771 B1 | 5/2002 | Gordon |
| 6,386,980 B1 | 5/2002 | Nishino et al. |
| 6,389,075 B2 | 5/2002 | Wang et al. |
| 6,389,218 B2 | 5/2002 | Gordon et al. |
| 6,415,031 B1 | 7/2002 | Colligan et al. |
| 6,415,437 B1 | 7/2002 | Ludvig et al. |
| 6,438,140 B1 | 8/2002 | Jungers et al. |
| 6,446,037 B1 | 9/2002 | Fielder et al. |

(56) References Cited

U.S. PATENT DOCUMENTS

| | | |
|---|---|---|
| 6,459,427 B1 | 10/2002 | Mao et al. |
| 6,477,182 B2 | 11/2002 | Calderone |
| 6,481,012 B1 | 11/2002 | Gordon et al. |
| 6,512,793 B1 | 1/2003 | Maeda |
| 6,525,746 B1 | 2/2003 | Lau et al. |
| 6,536,043 B1 | 3/2003 | Guedalia |
| 6,557,041 B2 | 4/2003 | Mallart |
| 6,560,496 B1 | 5/2003 | Michener |
| 6,564,378 B1 | 5/2003 | Satterfield et al. |
| 6,578,201 B1 | 6/2003 | LaRocca et al. |
| 6,579,184 B1 | 6/2003 | Tanskanen |
| 6,584,153 B1 | 6/2003 | Gordon et al. |
| 6,588,017 B1 | 7/2003 | Calderone |
| 6,598,229 B2 | 7/2003 | Smyth et al. |
| 6,604,224 B1 | 8/2003 | Armstrong et al. |
| 6,614,442 B1 | 9/2003 | Ouyang et al. |
| 6,621,870 B1 | 9/2003 | Gordon et al. |
| 6,625,574 B1 | 9/2003 | Taniguchi et al. |
| 6,645,076 B1 | 11/2003 | Sugai |
| 6,651,252 B1 | 11/2003 | Gordon et al. |
| 6,657,647 B1 | 12/2003 | Bright |
| 6,675,385 B1 | 1/2004 | Wang |
| 6,675,387 B1 | 1/2004 | Boucher et al. |
| 6,681,326 B2 | 1/2004 | Son et al. |
| 6,681,397 B1 | 1/2004 | Tsai et al. |
| 6,684,400 B1 | 1/2004 | Goode et al. |
| 6,687,663 B1 | 2/2004 | McGrath et al. |
| 6,691,208 B2 | 2/2004 | Dandrea et al. |
| 6,697,376 B1 | 2/2004 | Son et al. |
| 6,704,359 B1 | 3/2004 | Bayrakeri et al. |
| 6,717,600 B2 | 4/2004 | Dutta et al. |
| 6,718,552 B1 | 4/2004 | Goode |
| 6,721,794 B2 | 4/2004 | Taylor et al. |
| 6,721,956 B2 | 4/2004 | Wasilewski |
| 6,727,929 B1 | 4/2004 | Bates et al. |
| 6,731,605 B1 * | 5/2004 | Deshpande .................. 370/252 |
| 6,732,370 B1 | 5/2004 | Gordon et al. |
| 6,747,991 B1 | 6/2004 | Hemy et al. |
| 6,754,271 B1 | 6/2004 | Gordon et al. |
| 6,754,905 B2 | 6/2004 | Gordon et al. |
| 6,758,540 B1 | 7/2004 | Adolph et al. |
| 6,766,407 B1 | 7/2004 | Lisitsa et al. |
| 6,771,704 B1 | 8/2004 | Hannah |
| 6,785,902 B1 | 8/2004 | Zigmond et al. |
| 6,807,528 B1 | 10/2004 | Truman et al. |
| 6,810,528 B1 | 10/2004 | Chatani |
| 6,817,947 B2 | 11/2004 | Tanskanen |
| 6,886,178 B1 | 4/2005 | Mao et al. |
| 6,907,574 B2 | 6/2005 | Xu et al. |
| 6,931,291 B1 | 8/2005 | Alvarez-Tinoco et al. |
| 6,941,019 B1 | 9/2005 | Mitchell et al. |
| 6,941,574 B1 | 9/2005 | Broadwin et al. |
| 6,947,509 B1 | 9/2005 | Wong |
| 6,952,221 B1 | 10/2005 | Holtz et al. |
| 6,956,899 B2 | 10/2005 | Hall et al. |
| 7,016,540 B1 | 3/2006 | Gong et al. |
| 7,030,890 B1 | 4/2006 | Jouet et al. |
| 7,031,385 B1 | 4/2006 | Inoue et al. |
| 7,050,113 B2 | 5/2006 | Campisano et al. |
| 7,089,577 B1 | 8/2006 | Rakib et al. |
| 7,095,402 B2 | 8/2006 | Kunii et al. |
| 7,114,167 B2 | 9/2006 | Slemmer et al. |
| 7,146,615 B1 | 12/2006 | Hervet et al. |
| 7,158,676 B1 | 1/2007 | Rainsford |
| 7,200,836 B2 | 4/2007 | Brodersen et al. |
| 7,212,573 B2 | 5/2007 | Winger |
| 7,224,731 B2 | 5/2007 | Mehrotra |
| 7,272,556 B1 | 9/2007 | Aguilar et al. |
| 7,310,619 B2 | 12/2007 | Baar et al. |
| 7,325,043 B1 | 1/2008 | Rosenberg et al. |
| 7,346,111 B2 | 3/2008 | Winger et al. |
| 7,360,230 B1 | 4/2008 | Paz et al. |
| 7,412,423 B1 | 8/2008 | Asano |
| 7,412,505 B2 | 8/2008 | Slemmer et al. |
| 7,421,082 B2 | 9/2008 | Kamiya et al. |
| 7,444,306 B2 | 10/2008 | Varble |
| 7,444,418 B2 * | 10/2008 | Chou et al. .................... 709/231 |
| 7,500,235 B2 | 3/2009 | Maynard et al. |
| 7,508,941 B1 | 3/2009 | O'Toole, Jr. et al. |
| 7,512,577 B2 | 3/2009 | Slemmer et al. |
| 7,543,073 B2 * | 6/2009 | Chou et al. .................... 709/231 |
| 7,596,764 B2 | 9/2009 | Vienneau et al. |
| 7,623,575 B2 | 11/2009 | Winger |
| 7,669,220 B2 | 2/2010 | Goode |
| 7,742,609 B2 | 6/2010 | Yeakel et al. |
| 7,743,400 B2 | 6/2010 | Kurauchi |
| 7,751,572 B2 | 7/2010 | Villemoes et al. |
| 7,757,157 B1 | 7/2010 | Fukuda |
| 7,830,388 B1 | 11/2010 | Lu |
| 7,840,905 B1 | 11/2010 | Weber et al. |
| 7,936,819 B2 | 5/2011 | Craig et al. |
| 7,970,263 B1 | 6/2011 | Asch |
| 7,987,489 B2 | 7/2011 | Krzyzanowski et al. |
| 8,027,353 B2 | 9/2011 | Damola et al. |
| 8,036,271 B2 | 10/2011 | Winger et al. |
| 8,046,798 B1 | 10/2011 | Schlack et al. |
| 8,074,248 B2 | 12/2011 | Sigmon et al. |
| 8,118,676 B2 | 2/2012 | Craig et al. |
| 8,136,033 B1 | 3/2012 | Bhargava et al. |
| 8,149,917 B2 | 4/2012 | Zhang et al. |
| 8,155,194 B2 | 4/2012 | Winger et al. |
| 8,155,202 B2 | 4/2012 | Landau |
| 8,170,107 B2 | 5/2012 | Winger |
| 8,194,862 B2 | 6/2012 | Herr et al. |
| 8,243,630 B2 * | 8/2012 | Luo et al. ...................... 370/261 |
| 8,270,439 B2 | 9/2012 | Herr et al. |
| 8,284,842 B2 | 10/2012 | Craig et al. |
| 8,296,424 B2 * | 10/2012 | Malloy et al. .................. 709/224 |
| 8,370,869 B2 | 2/2013 | Paek et al. |
| 8,411,754 B2 | 4/2013 | Zhang et al. |
| 8,442,110 B2 | 5/2013 | Pavlovskaia et al. |
| 8,473,996 B2 | 6/2013 | Gordon et al. |
| 8,619,867 B2 | 12/2013 | Craig et al. |
| 8,621,500 B2 * | 12/2013 | Weaver et al. .................. 725/14 |
| 2001/0008845 A1 | 7/2001 | Kusuda et al. |
| 2001/0049301 A1 | 12/2001 | Masuda et al. |
| 2002/0007491 A1 | 1/2002 | Schiller et al. |
| 2002/0013812 A1 | 1/2002 | Krueger et al. |
| 2002/0016161 A1 | 2/2002 | Dellien et al. |
| 2002/0021353 A1 | 2/2002 | DeNies |
| 2002/0026642 A1 | 2/2002 | Augenbraun et al. |
| 2002/0027567 A1 | 3/2002 | Niamir |
| 2002/0032697 A1 | 3/2002 | French et al. |
| 2002/0040482 A1 | 4/2002 | Sextro et al. |
| 2002/0047899 A1 | 4/2002 | Son et al. |
| 2002/0049975 A1 | 4/2002 | Thomas et al. |
| 2002/0054578 A1 * | 5/2002 | Zhang et al. .................. 370/328 |
| 2002/0056083 A1 | 5/2002 | Istvan |
| 2002/0056107 A1 | 5/2002 | Schlack |
| 2002/0056136 A1 | 5/2002 | Wistendahl et al. |
| 2002/0059644 A1 | 5/2002 | Andrade et al. |
| 2002/0062484 A1 | 5/2002 | De Lange et al. |
| 2002/0067766 A1 | 6/2002 | Sakamoto et al. |
| 2002/0069267 A1 | 6/2002 | Thiele |
| 2002/0072408 A1 | 6/2002 | Kumagai |
| 2002/0078171 A1 | 6/2002 | Schneider |
| 2002/0078456 A1 | 6/2002 | Hudson et al. |
| 2002/0083464 A1 | 6/2002 | Tomsen et al. |
| 2002/0095689 A1 | 7/2002 | Novak |
| 2002/0105531 A1 | 8/2002 | Niemi |
| 2002/0108121 A1 | 8/2002 | Alao et al. |
| 2002/0131511 A1 | 9/2002 | Zenoni |
| 2002/0136298 A1 | 9/2002 | Anantharamu et al. |
| 2002/0152318 A1 | 10/2002 | Menon et al. |
| 2002/0171765 A1 | 11/2002 | Waki et al. |
| 2002/0175931 A1 | 11/2002 | Holtz et al. |
| 2002/0178447 A1 | 11/2002 | Plotnick et al. |
| 2002/0188628 A1 | 12/2002 | Cooper et al. |
| 2002/0191851 A1 | 12/2002 | Keinan |
| 2002/0194592 A1 | 12/2002 | Tsuchida et al. |
| 2002/0196746 A1 | 12/2002 | Allen |
| 2003/0018796 A1 | 1/2003 | Chou et al. |
| 2003/0020671 A1 | 1/2003 | Santoro et al. |
| 2003/0027517 A1 | 2/2003 | Callway et al. |

(56) References Cited

U.S. PATENT DOCUMENTS

| | | |
|---|---|---|
| 2003/0035486 A1 | 2/2003 | Kato et al. |
| 2003/0038893 A1 | 2/2003 | Rajamaki et al. |
| 2003/0039398 A1 | 2/2003 | McIntyre |
| 2003/0046690 A1 | 3/2003 | Miller |
| 2003/0051253 A1 | 3/2003 | Barone, Jr. |
| 2003/0058941 A1 | 3/2003 | Chen et al. |
| 2003/0061451 A1 | 3/2003 | Beyda |
| 2003/0065739 A1 | 4/2003 | Shnier |
| 2003/0071792 A1 | 4/2003 | Safadi |
| 2003/0072372 A1 | 4/2003 | Shen et al. |
| 2003/0076546 A1 | 4/2003 | Johnson et al. |
| 2003/0088328 A1 | 5/2003 | Nishio et al. |
| 2003/0088400 A1 | 5/2003 | Nishio et al. |
| 2003/0095790 A1 | 5/2003 | Joshi |
| 2003/0107443 A1 | 6/2003 | Yamamoto |
| 2003/0122836 A1 | 7/2003 | Doyle et al. |
| 2003/0123664 A1 | 7/2003 | Pedlow, Jr. et al. |
| 2003/0126608 A1 | 7/2003 | Safadi et al. |
| 2003/0126611 A1 | 7/2003 | Chernock et al. |
| 2003/0131349 A1 | 7/2003 | Kuczynski-Brown |
| 2003/0135860 A1 | 7/2003 | Dureau |
| 2003/0169373 A1 | 9/2003 | Peters et al. |
| 2003/0177199 A1 | 9/2003 | Zenoni |
| 2003/0188309 A1 | 10/2003 | Yuen |
| 2003/0189980 A1 | 10/2003 | Dvir et al. |
| 2003/0196174 A1 | 10/2003 | Pierre Cote et al. |
| 2003/0208768 A1 | 11/2003 | Urdang et al. |
| 2003/0229719 A1 | 12/2003 | Iwata et al. |
| 2003/0229900 A1 | 12/2003 | Reisman |
| 2003/0231218 A1 | 12/2003 | Amadio |
| 2004/0016000 A1 | 1/2004 | Zhang et al. |
| 2004/0034873 A1 | 2/2004 | Zenoni |
| 2004/0040035 A1 | 2/2004 | Carlucci et al. |
| 2004/0078822 A1 | 4/2004 | Breen et al. |
| 2004/0088375 A1 | 5/2004 | Sethi et al. |
| 2004/0091171 A1 | 5/2004 | Bone |
| 2004/0111526 A1 | 6/2004 | Baldwin et al. |
| 2004/0117827 A1 | 6/2004 | Karaoguz et al. |
| 2004/0128686 A1 | 7/2004 | Boyer et al. |
| 2004/0133704 A1 | 7/2004 | Krzyzanowski et al. |
| 2004/0136698 A1 | 7/2004 | Mock |
| 2004/0139158 A1 | 7/2004 | Datta |
| 2004/0157662 A1 | 8/2004 | Tsuchiya |
| 2004/0163101 A1 | 8/2004 | Swix et al. |
| 2004/0184542 A1 | 9/2004 | Fujimoto |
| 2004/0193648 A1 | 9/2004 | Lai et al. |
| 2004/0210824 A1 | 10/2004 | Shoff et al. |
| 2004/0261106 A1 | 12/2004 | Hoffman |
| 2004/0261114 A1 | 12/2004 | Addington et al. |
| 2005/0015259 A1 | 1/2005 | Thumpudi et al. |
| 2005/0015816 A1 | 1/2005 | Christofalo et al. |
| 2005/0021830 A1 | 1/2005 | Urzaiz et al. |
| 2005/0034155 A1 | 2/2005 | Gordon et al. |
| 2005/0034162 A1 | 2/2005 | White et al. |
| 2005/0044575 A1 | 2/2005 | Der Kuyl |
| 2005/0055685 A1 | 3/2005 | Maynard et al. |
| 2005/0055721 A1 | 3/2005 | Zigmond et al. |
| 2005/0071876 A1 | 3/2005 | van Beek |
| 2005/0076134 A1 | 4/2005 | Bialik et al. |
| 2005/0089091 A1 | 4/2005 | Kim et al. |
| 2005/0091690 A1 | 4/2005 | Delpuch et al. |
| 2005/0091695 A1 | 4/2005 | Paz et al. |
| 2005/0105608 A1 | 5/2005 | Coleman et al. |
| 2005/0114906 A1 | 5/2005 | Hoarty et al. |
| 2005/0132305 A1 | 6/2005 | Guichard et al. |
| 2005/0135385 A1 | 6/2005 | Jenkins et al. |
| 2005/0141613 A1 | 6/2005 | Kelly et al. |
| 2005/0149988 A1 | 7/2005 | Grannan |
| 2005/0160088 A1 | 7/2005 | Scallan et al. |
| 2005/0166257 A1 | 7/2005 | Feinleib et al. |
| 2005/0180502 A1 | 8/2005 | Puri |
| 2005/0198682 A1* | 9/2005 | Wright ............................ 725/96 |
| 2005/0213586 A1* | 9/2005 | Cyganski et al. ........ 370/395.41 |
| 2005/0216933 A1 | 9/2005 | Black |
| 2005/0216940 A1 | 9/2005 | Black |
| 2005/0226426 A1 | 10/2005 | Oomen et al. |
| 2005/0273832 A1 | 12/2005 | Zigmond et al. |
| 2005/0283741 A1 | 12/2005 | Balabanovic et al. |
| 2006/0001737 A1 | 1/2006 | Dawson et al. |
| 2006/0020960 A1 | 1/2006 | Relan et al. |
| 2006/0020994 A1 | 1/2006 | Crane et al. |
| 2006/0031906 A1 | 2/2006 | Kaneda |
| 2006/0039481 A1 | 2/2006 | Shen et al. |
| 2006/0041910 A1 | 2/2006 | Hatanaka et al. |
| 2006/0088105 A1 | 4/2006 | Shen et al. |
| 2006/0095944 A1 | 5/2006 | Demircin et al. |
| 2006/0112338 A1 | 5/2006 | Joung et al. |
| 2006/0117340 A1 | 6/2006 | Pavlovskaia et al. |
| 2006/0143678 A1* | 6/2006 | Chou et al. .................... 725/118 |
| 2006/0161538 A1 | 7/2006 | Kiilerich |
| 2006/0173985 A1 | 8/2006 | Moore |
| 2006/0174026 A1 | 8/2006 | Robinson et al. |
| 2006/0174289 A1 | 8/2006 | Theberge |
| 2006/0195884 A1 | 8/2006 | van Zoest et al. |
| 2006/0212203 A1 | 9/2006 | Furuno |
| 2006/0218601 A1 | 9/2006 | Michel |
| 2006/0230428 A1 | 10/2006 | Craig et al. |
| 2006/0242570 A1 | 10/2006 | Croft et al. |
| 2006/0256865 A1 | 11/2006 | Westerman |
| 2006/0269086 A1 | 11/2006 | Page et al. |
| 2006/0271985 A1 | 11/2006 | Hoffman et al. |
| 2006/0285586 A1 | 12/2006 | Westerman |
| 2006/0285819 A1 | 12/2006 | Kelly et al. |
| 2007/0005783 A1 | 1/2007 | Saint-Hillaire et al. |
| 2007/0009035 A1 | 1/2007 | Craig et al. |
| 2007/0009036 A1 | 1/2007 | Craig et al. |
| 2007/0009042 A1 | 1/2007 | Craig et al. |
| 2007/0025639 A1 | 2/2007 | Zhou et al. |
| 2007/0033528 A1 | 2/2007 | Merrit et al. |
| 2007/0033631 A1 | 2/2007 | Gordon et al. |
| 2007/0074251 A1 | 3/2007 | Oguz et al. |
| 2007/0079325 A1 | 4/2007 | de Heer |
| 2007/0115941 A1 | 5/2007 | Patel et al. |
| 2007/0124282 A1 | 5/2007 | Wittkotter |
| 2007/0124795 A1 | 5/2007 | McKissick et al. |
| 2007/0130446 A1 | 6/2007 | Minakami |
| 2007/0130592 A1 | 6/2007 | Haeusel |
| 2007/0152984 A1 | 7/2007 | Ording et al. |
| 2007/0162953 A1 | 7/2007 | Bolliger et al. |
| 2007/0172061 A1 | 7/2007 | Pinder |
| 2007/0174790 A1 | 7/2007 | Jing et al. |
| 2007/0178243 A1 | 8/2007 | Houck et al. |
| 2007/0237232 A1 | 10/2007 | Chang et al. |
| 2007/0300280 A1 | 12/2007 | Turner et al. |
| 2008/0046928 A1 | 2/2008 | Poling et al. |
| 2008/0052742 A1 | 2/2008 | Kopf et al. |
| 2008/0066135 A1 | 3/2008 | Brodersen et al. |
| 2008/0084503 A1 | 4/2008 | Kondo |
| 2008/0086688 A1 | 4/2008 | Chandratillake et al. |
| 2008/0094368 A1 | 4/2008 | Ording et al. |
| 2008/0098450 A1 | 4/2008 | Wu et al. |
| 2008/0104520 A1 | 5/2008 | Swenson et al. |
| 2008/0127255 A1 | 5/2008 | Ress et al. |
| 2008/0154583 A1 | 6/2008 | Goto et al. |
| 2008/0163059 A1 | 7/2008 | Craner |
| 2008/0163286 A1 | 7/2008 | Rudolph et al. |
| 2008/0170619 A1 | 7/2008 | Landau |
| 2008/0170622 A1 | 7/2008 | Gordon et al. |
| 2008/0178125 A1 | 7/2008 | Elsbree et al. |
| 2008/0178243 A1 | 7/2008 | Dong et al. |
| 2008/0178249 A1 | 7/2008 | Gordon et al. |
| 2008/0181221 A1* | 7/2008 | Kampmann et al. .......... 370/389 |
| 2008/0189740 A1 | 8/2008 | Carpenter et al. |
| 2008/0195573 A1 | 8/2008 | Onoda et al. |
| 2008/0201736 A1 | 8/2008 | Gordon et al. |
| 2008/0212942 A1 | 9/2008 | Gordon et al. |
| 2008/0232452 A1 | 9/2008 | Sullivan et al. |
| 2008/0243918 A1 | 10/2008 | Holtman |
| 2008/0243998 A1 | 10/2008 | Oh et al. |
| 2008/0246759 A1 | 10/2008 | Summers |
| 2008/0253440 A1 | 10/2008 | Srinivasan et al. |
| 2008/0271080 A1 | 10/2008 | Gossweiler et al. |
| 2009/0003446 A1 | 1/2009 | Wu et al. |
| 2009/0003705 A1 | 1/2009 | Zou et al. |

(56) References Cited

U.S. PATENT DOCUMENTS

| | | |
|---|---|---|
| 2009/0007199 A1 | 1/2009 | La Joie |
| 2009/0025027 A1 | 1/2009 | Craner |
| 2009/0031341 A1 | 1/2009 | Schlack et al. |
| 2009/0041118 A1 | 2/2009 | Pavlovskaia et al. |
| 2009/0083781 A1 | 3/2009 | Yang et al. |
| 2009/0083813 A1 | 3/2009 | Dolce et al. |
| 2009/0083824 A1 | 3/2009 | McCarthy et al. |
| 2009/0089188 A1 | 4/2009 | Ku et al. |
| 2009/0094113 A1 | 4/2009 | Berry et al. |
| 2009/0094646 A1 | 4/2009 | Walter et al. |
| 2009/0100465 A1 | 4/2009 | Kulakowski |
| 2009/0100489 A1 | 4/2009 | Strothmann |
| 2009/0106269 A1 | 4/2009 | Zuckerman et al. |
| 2009/0106386 A1 | 4/2009 | Zuckerman et al. |
| 2009/0106392 A1 | 4/2009 | Zuckerman et al. |
| 2009/0106425 A1 | 4/2009 | Zuckerman et al. |
| 2009/0106441 A1 | 4/2009 | Zuckerman et al. |
| 2009/0106451 A1 | 4/2009 | Zuckerman et al. |
| 2009/0106511 A1 | 4/2009 | Zuckerman et al. |
| 2009/0113009 A1 | 4/2009 | Slemmer et al. |
| 2009/0132942 A1 | 5/2009 | Santoro et al. |
| 2009/0138966 A1 | 5/2009 | Krause et al. |
| 2009/0144781 A1 | 6/2009 | Glaser et al. |
| 2009/0146779 A1 | 6/2009 | Kumar et al. |
| 2009/0157868 A1 | 6/2009 | Chaudhry |
| 2009/0158369 A1 | 6/2009 | Van Vleck et al. |
| 2009/0160694 A1 | 6/2009 | Di Flora |
| 2009/0172757 A1 | 7/2009 | Aldrey et al. |
| 2009/0178098 A1 | 7/2009 | Westbrook et al. |
| 2009/0183219 A1 | 7/2009 | Maynard et al. |
| 2009/0189890 A1 | 7/2009 | Corbett et al. |
| 2009/0193452 A1 | 7/2009 | Russ et al. |
| 2009/0196346 A1 | 8/2009 | Zhang et al. |
| 2009/0204920 A1 | 8/2009 | Beverley et al. |
| 2009/0210899 A1 | 8/2009 | Lawrence-Apfelbaum et al. |
| 2009/0225790 A1 | 9/2009 | Shay et al. |
| 2009/0228620 A1 | 9/2009 | Thomas et al. |
| 2009/0228922 A1 | 9/2009 | Haj-Khalil et al. |
| 2009/0233593 A1 | 9/2009 | Ergen et al. |
| 2009/0251478 A1 | 10/2009 | Maillot et al. |
| 2009/0254960 A1 | 10/2009 | Yarom et al. |
| 2009/0265617 A1 | 10/2009 | Randall et al. |
| 2009/0271512 A1* | 10/2009 | Jorgensen ................ 709/224 |
| 2009/0271818 A1 | 10/2009 | Schlack |
| 2009/0298535 A1 | 12/2009 | Klein et al. |
| 2009/0313674 A1 | 12/2009 | Ludvig et al. |
| 2009/0328109 A1 | 12/2009 | Pavlovskaia et al. |
| 2010/0033638 A1 | 2/2010 | O'Donnell et al. |
| 2010/0035682 A1 | 2/2010 | Gentile et al. |
| 2010/0058404 A1 | 3/2010 | Rouse |
| 2010/0067571 A1 | 3/2010 | White et al. |
| 2010/0077441 A1 | 3/2010 | Thomas et al. |
| 2010/0104021 A1 | 4/2010 | Schmit |
| 2010/0115573 A1 | 5/2010 | Srinivasan et al. |
| 2010/0118972 A1 | 5/2010 | Zhang et al. |
| 2010/0131996 A1 | 5/2010 | Gauld |
| 2010/0146139 A1 | 6/2010 | Brockmann |
| 2010/0158109 A1 | 6/2010 | Dahlby et al. |
| 2010/0161825 A1* | 6/2010 | Ronca et al. ................ 709/231 |
| 2010/0166071 A1 | 7/2010 | Wu et al. |
| 2010/0174776 A1 | 7/2010 | Westberg et al. |
| 2010/0175080 A1 | 7/2010 | Yuen et al. |
| 2010/0180307 A1 | 7/2010 | Hayes et al. |
| 2010/0211983 A1 | 8/2010 | Chou |
| 2010/0226428 A1 | 9/2010 | Thevathasan et al. |
| 2010/0235861 A1 | 9/2010 | Schein et al. |
| 2010/0242073 A1 | 9/2010 | Gordon et al. |
| 2010/0251167 A1 | 9/2010 | Deluca et al. |
| 2010/0254370 A1 | 10/2010 | Jana et al. |
| 2010/0265344 A1 | 10/2010 | Velarde et al. |
| 2010/0325655 A1 | 12/2010 | Perez |
| 2011/0002376 A1 | 1/2011 | Ahmed et al. |
| 2011/0002470 A1 | 1/2011 | Purnhagen et al. |
| 2011/0023069 A1 | 1/2011 | Dowens |
| 2011/0035227 A1 | 2/2011 | Lee et al. |
| 2011/0067061 A1 | 3/2011 | Karaoguz et al. |
| 2011/0096828 A1* | 4/2011 | Chen et al. ................ 375/240.02 |
| 2011/0107375 A1 | 5/2011 | Stahl et al. |
| 2011/0110642 A1 | 5/2011 | Salomons et al. |
| 2011/0150421 A1 | 6/2011 | Sasaki et al. |
| 2011/0153776 A1 | 6/2011 | Opala et al. |
| 2011/0167468 A1 | 7/2011 | Lee et al. |
| 2011/0191684 A1 | 8/2011 | Greenberg |
| 2011/0243024 A1* | 10/2011 | Osterling et al. ................ 370/252 |
| 2011/0258584 A1 | 10/2011 | Williams et al. |
| 2011/0289536 A1 | 11/2011 | Poder et al. |
| 2011/0317982 A1 | 12/2011 | Xu et al. |
| 2012/0023126 A1 | 1/2012 | Jin et al. |
| 2012/0030212 A1 | 2/2012 | Koopmans et al. |
| 2012/0137337 A1 | 5/2012 | Sigmon, Jr. et al. |
| 2012/0204217 A1 | 8/2012 | Regis et al. |
| 2012/0209815 A1 | 8/2012 | Carson et al. |
| 2012/0224641 A1 | 9/2012 | Haberman et al. |
| 2012/0257671 A1 | 10/2012 | Brockmann et al. |
| 2013/0003826 A1 | 1/2013 | Craig et al. |
| 2013/0071095 A1 | 3/2013 | Chauvier et al. |
| 2013/0086610 A1 | 4/2013 | Brockmann |
| 2013/0179787 A1 | 7/2013 | Brockmann et al. |
| 2013/0198776 A1 | 8/2013 | Brockmann |
| 2013/0254308 A1 | 9/2013 | Rose et al. |
| 2013/0272394 A1 | 10/2013 | Brockmann et al. |
| 2014/0033036 A1 | 1/2014 | Gaur et al. |

FOREIGN PATENT DOCUMENTS

| | | |
|---|---|---|
| AT | 250313 T | 10/2003 |
| AT | 472152 T | 7/2010 |
| AT | 475266 T | 8/2010 |
| AU | 550086 B2 | 2/1986 |
| AU | 199060189 | 11/1990 |
| AU | 620735 B2 | 2/1992 |
| AU | 199184838 | 4/1992 |
| AU | 643828 B2 | 11/1993 |
| AU | 2004253127 A1 | 1/2005 |
| AU | 2005278122 A1 | 3/2006 |
| AU | 2010339376 A1 | 8/2012 |
| AU | 2011249132 A1 | 11/2012 |
| AU | 2011258972 A1 | 11/2012 |
| AU | 2011315950 A1 | 5/2013 |
| CA | 682776 A | 3/1964 |
| CA | 2052477 | 3/1992 |
| CA | 1302554 | 6/1992 |
| CA | 2163500 | 5/1996 |
| CA | 2231391 A1 | 5/1997 |
| CA | 2273365 A1 | 6/1998 |
| CA | 2313133 A1 | 6/1999 |
| CA | 2313161 A1 | 6/1999 |
| CA | 2528499 A1 | 1/2005 |
| CA | 2569407 A1 | 3/2006 |
| CA | 2728797 A1 | 4/2010 |
| CA | 2787913 A1 | 7/2011 |
| CA | 2798541 A1 | 12/2011 |
| CA | 2814070 A1 | 4/2012 |
| CN | 1507751 A | 6/2004 |
| CN | 1969555 A | 5/2007 |
| CN | 101180109 A | 5/2008 |
| CN | 101627424 A | 1/2010 |
| CN | 101637023 A | 1/2010 |
| CN | 102007773 A | 4/2011 |
| DE | 4408355 A1 | 10/1994 |
| DE | 69516139 | 12/2000 |
| DE | 69132518 | 9/2001 |
| DE | 69333207 | 7/2004 |
| DE | 98961961 T1 | 8/2007 |
| DE | 602008001596 | 8/2010 |
| DE | 602006015650 D1 | 9/2010 |
| EP | 0093549 A2 | 11/1983 |
| EP | 0128771 A2 | 12/1984 |
| EP | 0419137 A2 | 3/1991 |
| EP | 0449633 A1 | 10/1991 |
| EP | 0477786 A2 | 4/1992 |
| EP | 0523618 A2 | 1/1993 |
| EP | 0534139 A2 | 3/1993 |
| EP | 0568453 A1 | 11/1993 |

(56) References Cited

FOREIGN PATENT DOCUMENTS

| | | |
|---|---|---|
| EP | 0588653 A2 | 3/1994 |
| EP | 0594350 A1 | 4/1994 |
| EP | 0612916 A2 | 8/1994 |
| EP | 0624039 A2 | 11/1994 |
| EP | 0638219 A1 | 2/1995 |
| EP | 0643523 A1 | 3/1995 |
| EP | 0661888 A2 | 7/1995 |
| EP | 0714684 A1 | 6/1996 |
| EP | 0746158 A2 | 12/1996 |
| EP | 0761066 A1 | 3/1997 |
| EP | 0789972 A1 | 8/1997 |
| EP | 0830786 A1 | 3/1998 |
| EP | 0861560 A1 | 9/1998 |
| EP | 0933966 | 8/1999 |
| EP | 0933966 A1 | 8/1999 |
| EP | 1026872 A1 | 8/2000 |
| EP | 1038397 A1 | 9/2000 |
| EP | 1038399 A1 | 9/2000 |
| EP | 1038400 A1 | 9/2000 |
| EP | 1038401 A1 | 9/2000 |
| EP | 1051039 A2 | 11/2000 |
| EP | 1055331 A1 | 11/2000 |
| EP | 1120968 A1 | 8/2001 |
| EP | 1345446 A1 | 9/2003 |
| EP | 1422929 A2 | 5/2004 |
| EP | 1428562 A2 | 6/2004 |
| EP | 1521476 A1 | 4/2005 |
| EP | 1645115 A1 | 4/2006 |
| EP | 1725044 A2 | 11/2006 |
| EP | 1767708 A2 | 3/2007 |
| EP | 1771003 A1 | 4/2007 |
| EP | 1772014 A1 | 4/2007 |
| EP | 1877150 A1 | 1/2008 |
| EP | 1887148 A2 | 2/2008 |
| EP | 1900200 A1 | 3/2008 |
| EP | 1902583 A1 | 3/2008 |
| EP | 1908293 A1 | 4/2008 |
| EP | 1911288 A2 | 4/2008 |
| EP | 1918802 A1 | 5/2008 |
| EP | 2100296 A1 | 9/2009 |
| EP | 2105019 A2 | 9/2009 |
| EP | 2106665 A2 | 10/2009 |
| EP | 2116051 A2 | 11/2009 |
| EP | 2124440 A1 | 11/2009 |
| EP | 2248341 A1 | 11/2010 |
| EP | 2269377 A2 | 1/2011 |
| EP | 2271098 A1 | 1/2011 |
| EP | 2304953 A2 | 4/2011 |
| EP | 2364019 A2 | 9/2011 |
| EP | 2384001 A1 | 11/2011 |
| EP | 2409493 A2 | 1/2012 |
| EP | 2477414 A2 | 7/2012 |
| EP | 2487919 A2 | 8/2012 |
| EP | 2520090 A2 | 11/2012 |
| EP | 2567545 A1 | 3/2013 |
| EP | 2577437 A1 | 4/2013 |
| EP | 2628306 A2 | 8/2013 |
| EP | 2632164 A2 | 8/2013 |
| EP | 2632165 A2 | 8/2013 |
| EP | 2695388 A2 | 2/2014 |
| ES | 2207635 T3 | 6/2004 |
| FR | 8211463 A | 6/1982 |
| FR | 2529739 | 1/1984 |
| FR | 2891098 | 3/2007 |
| GB | 2207838 A | 2/1989 |
| GB | 2248955 A | 4/1992 |
| GB | 2290204 A | 12/1995 |
| GB | 2365649 A | 2/2002 |
| GB | 2378345 | 2/2003 |
| HK | 1134855 A1 | 10/2010 |
| HK | 1116323 A1 | 12/2010 |
| IE | 19913397 A1 | 4/1992 |
| IL | 99586 A | 2/1998 |
| IL | 215133 | 12/2011 |
| IL | 222829 | 12/2012 |
| IL | 222830 | 12/2012 |
| IL | 225525 | 6/2013 |
| IN | 180215 B | 1/1998 |
| IN | 200701744 P3 | 11/2007 |
| IN | 200900856 P3 | 5/2009 |
| IN | 200800214 P3 | 6/2009 |
| IS | 3759 A7 | 3/1992 |
| JP | 60-054324 A | 3/1985 |
| JP | 63-033988 | 2/1988 |
| JP | 63-263985 A | 10/1988 |
| JP | 2001-241993 A | 9/1989 |
| JP | 04-373286 A | 12/1992 |
| JP | 06-054324 A | 2/1994 |
| JP | 7015720 A | 1/1995 |
| JP | 7-160292 A | 6/1995 |
| JP | 8-265704 A | 10/1996 |
| JP | 10-228437 A | 8/1998 |
| JP | 10-510131 | 9/1998 |
| JP | 11-134273 A | 5/1999 |
| JP | H11-261966 | 9/1999 |
| JP | 2000-152234 | 5/2000 |
| JP | 2001-203995 A | 7/2001 |
| JP | 2001-245271 | 9/2001 |
| JP | 2001-245291 | 9/2001 |
| JP | 2001-514471 | 9/2001 |
| JP | 2002-016920 | 1/2002 |
| JP | 2002-057952 A | 2/2002 |
| JP | 2002-112220 A | 4/2002 |
| JP | 2002-141810 A | 5/2002 |
| JP | 2002-208027 | 7/2002 |
| JP | 2002-319991 | 10/2002 |
| JP | 2003-506763 A | 2/2003 |
| JP | 2003-087785 | 3/2003 |
| JP | 2003-529234 | 9/2003 |
| JP | 2004-501445 A | 1/2004 |
| JP | 2004-056777 A | 2/2004 |
| JP | 2004-110850 | 4/2004 |
| JP | 2004-112441 | 4/2004 |
| JP | 2004-135932 A | 5/2004 |
| JP | 2004-264812 A | 9/2004 |
| JP | 2004-533736 A | 11/2004 |
| JP | 2004-536381 A | 12/2004 |
| JP | 2004-536681 | 12/2004 |
| JP | 2005-033741 | 2/2005 |
| JP | 2005-084987 A | 3/2005 |
| JP | 2005-095599 | 3/2005 |
| JP | 8-095599 A | 4/2005 |
| JP | 2005-156996 | 6/2005 |
| JP | 2005-519382 | 6/2005 |
| JP | 2005-523479 A | 8/2005 |
| JP | 2005-309752 | 11/2005 |
| JP | 2006-067280 | 3/2006 |
| JP | 2006-512838 | 4/2006 |
| JP | 2007-522727 | 8/2007 |
| JP | 11-88419 | 9/2007 |
| JP | 2008-523880 | 7/2008 |
| JP | 2008-535622 A | 9/2008 |
| JP | 04252727 B2 | 4/2009 |
| JP | 2009-543386 A | 12/2009 |
| JP | 2011-108155 A | 6/2011 |
| JP | 2012-080593 A | 4/2012 |
| JP | 04996603 B2 | 8/2012 |
| JP | 05121711 B2 | 1/2013 |
| JP | 53-004612 A | 10/2013 |
| JP | 05331008 B2 | 10/2013 |
| JP | 05405819 B2 | 2/2014 |
| KR | 2006067924 A | 6/2006 |
| KR | 2007038111 A | 4/2007 |
| KR | 20080001298 A | 1/2008 |
| KR | 2008024189 A | 3/2008 |
| KR | 2010111739 A | 10/2010 |
| KR | 2010120187 A | 11/2010 |
| KR | 2010127240 A | 12/2010 |
| KR | 2011030640 A | 3/2011 |
| KR | 2011129477 A | 12/2011 |
| KR | 20120112683 A | 10/2012 |
| KR | 2013061149 A | 6/2013 |
| KR | 2013113925 A | 10/2013 |
| KR | 1333200 B1 | 11/2013 |

(56) References Cited

FOREIGN PATENT DOCUMENTS

| | | |
|---|---|---|
| KR | 2008045154 A | 11/2013 |
| KR | 2013138263 A | 12/2013 |
| NL | 1032594 C2 | 4/2008 |
| NL | 1033929 C1 | 4/2008 |
| NL | 2004670 A | 11/2011 |
| NL | 2004780 A | 1/2012 |
| NZ | 239969 A | 12/1994 |
| PT | 99110 A | 12/1993 |
| WO | WO 8202303 A1 | 7/1982 |
| WO | WO 8908967 A1 | 9/1989 |
| WO | WO 90/13972 A1 | 11/1990 |
| WO | WO 93/22877 A2 | 11/1993 |
| WO | WO 9416534 A2 | 7/1994 |
| WO | WO 9419910 A1 | 9/1994 |
| WO | WO 9421079 A1 | 9/1994 |
| WO | WO 95/15658 A1 | 6/1995 |
| WO | WO 9532587 A1 | 11/1995 |
| WO | WO 9533342 A1 | 12/1995 |
| WO | WO 9614712 A1 | 5/1996 |
| WO | WO 9627843 A1 | 9/1996 |
| WO | WO 9631826 A1 | 10/1996 |
| WO | WO 9637074 A2 | 11/1996 |
| WO | WO 9642168 A1 | 12/1996 |
| WO | WO 9716925 A1 | 5/1997 |
| WO | WO 9733434 A1 | 9/1997 |
| WO | WO 9739583 A1 | 10/1997 |
| WO | WO 9826595 A1 | 6/1998 |
| WO | WO 99/00735 A1 | 1/1999 |
| WO | WO 99/04568 | 1/1999 |
| WO | WO 9900735 A1 | 1/1999 |
| WO | WO 9930496 A1 | 6/1999 |
| WO | WO 9930497 A1 | 6/1999 |
| WO | WO 9930500 A1 | 6/1999 |
| WO | WO 9930501 A1 | 6/1999 |
| WO | WO 9935840 A1 | 7/1999 |
| WO | WO 9941911 A1 | 8/1999 |
| WO | WO 9956468 A1 | 11/1999 |
| WO | WO 99/65232 A1 | 12/1999 |
| WO | WO 99/65243 A1 | 12/1999 |
| WO | WO 9966732 A1 | 12/1999 |
| WO | WO 0002303 A1 | 1/2000 |
| WO | WO 00/07372 A1 | 2/2000 |
| WO | WO 00/08967 A1 | 2/2000 |
| WO | WO 00/19910 A1 | 4/2000 |
| WO | WO 00/38430 A1 | 6/2000 |
| WO | WO 00/41397 A1 | 7/2000 |
| WO | WO 01/39494 A1 | 5/2001 |
| WO | WO 01/41447 A1 | 6/2001 |
| WO | WO 01/82614 A1 | 11/2001 |
| WO | WO 01/92973 | 12/2001 |
| WO | WO 02/089487 A2 | 7/2002 |
| WO | WO 02/076097 A1 | 9/2002 |
| WO | WO 02/076099 A1 | 9/2002 |
| WO | WO 03/026232 A1 | 3/2003 |
| WO | WO 03/026275 A2 | 3/2003 |
| WO | WO 03/047710 A2 | 6/2003 |
| WO | WO 03/065683 A1 | 8/2003 |
| WO | WO 03/071727 A2 | 8/2003 |
| WO | WO 03/091832 A2 | 11/2003 |
| WO | WO 2004/012437 A2 | 2/2004 |
| WO | WO 2004/018060 A2 | 3/2004 |
| WO | WO 2004/073310 A1 | 8/2004 |
| WO | WO 2005/002215 A1 | 1/2005 |
| WO | WO 2005/041122 A2 | 5/2005 |
| WO | WO 2005/053301 A2 | 6/2005 |
| WO | WO2005/076575 | 8/2005 |
| WO | WO 2005/120067 A2 | 12/2005 |
| WO | WO 2006/014362 A1 | 2/2006 |
| WO | WO 2006/022881 A1 | 3/2006 |
| WO | WO 2006/053305 | 5/2006 |
| WO | WO 2006/067697 A2 | 6/2006 |
| WO | WO 2006/081634 A2 | 8/2006 |
| WO | WO 2006/105480 | 10/2006 |
| WO | WO 2006/110268 A1 | 10/2006 |
| WO | WO 2007/001797 A1 | 1/2007 |
| WO | WO 2007/008319 A1 | 1/2007 |
| WO | WO 2007/008355 A2 | 1/2007 |
| WO | WO 2007/008356 A1 | 1/2007 |
| WO | WO 2007/008357 A1 | 1/2007 |
| WO | WO 2007/008358 A1 | 1/2007 |
| WO | WO 2007/018722 A2 | 2/2007 |
| WO | WO 2007/018726 A2 | 2/2007 |
| WO | WO 2008/044916 A2 | 4/2008 |
| WO | WO 2008/086170 A1 | 7/2008 |
| WO | WO 2008/088741 A2 | 7/2008 |
| WO | WO 2008/088752 A2 | 7/2008 |
| WO | WO 2008/088772 A2 | 7/2008 |
| WO | WO 2008/100205 A1 | 8/2008 |
| WO | WO 2009/038596 A1 | 3/2009 |
| WO | WO 2009/099893 A1 | 8/2009 |
| WO | WO 2009/099895 A1 | 8/2009 |
| WO | WO 2009/105465 A2 | 8/2009 |
| WO | WO 2009/110897 A1 | 9/2009 |
| WO | WO 2009/114247 A2 | 9/2009 |
| WO | WO 2009/155214 A2 | 12/2009 |
| WO | WO 2010/044926 A3 | 4/2010 |
| WO | WO 2010/054136 A2 | 5/2010 |
| WO | WO 2010/107954 A2 | 9/2010 |
| WO | WO 2011/014336 A1 | 9/2010 |
| WO | WO 2011/082364 A2 | 7/2011 |
| WO | WO 2011/139155 A1 | 11/2011 |
| WO | WO 2011/149357 A1 | 12/2011 |
| WO | WO 2012/051528 A2 | 4/2012 |
| WO | WO 2012/138660 A2 | 10/2012 |
| WO | WO 2013/106390 A1 | 7/2013 |
| WO | WO 2013/155310 A1 | 7/2013 |

OTHER PUBLICATIONS

ActiveVideo Networks Inc., International Search Report and Written Opinion, PCT/US2012/032010, Oct. 10, 2012, 6 pgs.

ActiveVideo Networks Inc., International Preliminary Report on Patentability, PCT/US2012/032010, Oct. 17, 2013, 4 pgs.

ActiveVideo, http://www.activevideo.com/, as printed out in year 2012, 1 pg.

ActiveVideo Networks Inc., International Preliminary Report on Patentability, PCT/US2013/020769, Jul. 24, 2014, 6 pgs.

ActiveVideo Networks Inc., International Search Report and Written Opinion, PCT/US2014/030773, Jul. 25, 2014, 8 pgs.

ActiveVideo Networks Inc., International Search Report and Written Opinion, PCT/US2014/041416, Aug. 27, 2014, 8 pgs.

ActiveVideo Networks Inc., Extended EP Search Rpt, Application No. 13168509.1, 10 pgs.

ActiveVideo Networks Inc., Extended EP Search Rpt, Application No. 13168376-5, 8 pgs.

ActiveVideo Networks Inc., Extended EP Search Rpt, Application No. 12767642-7, 12 pgs.

ActiveVideo Networks Inc., Communication Pursuant to Rules 70(2) and 70a(2), EP10841764.3, Jun. 6, 2014, 1 pg.

ActiveVideo Networks Inc., Communication Pursuant to Article 94(3) EPC, EP08713106.6, Jun. 26, 2014, 5 pgs.

ActiveVideo Networks Inc., Communication Pursuant to Article 94(3) EPC, EP08713106.6-2223, May 10, 2011, 7 pgs.

ActiveVideo Networks Inc., Communication Pursuant to Article 94(3) EPC, EP09713486.0, Apr. 14, 2014, 6 pgs.

ActiveVideo Networks Inc., Examination Report No. 1, AU2011258972, Apr. 4, 2013, 5 pgs.

ActiveVideo Networks Inc., Examination Report No. 1, AU2010339376, Apr. 30, 2014, 4 pgs.

ActiveVideo Networks Inc., Examination Report, App. No. EP11749946.7, Oct. 8, 2013, 6 pgs.

ActiveVideo Networks Inc., Summons to attend oral-proceeding, Application No. EP09820936-4, Aug. 19, 2014, 4 pgs.

ActiveVideo Networks Inc., International Searching Authority, International Search Report—International application No. PCT/US2010/027724, dated Oct. 28, 2010, together with the Written Opinion of the International Searching Authority, 7 pages.

Adams, Jerry, NTZ Nachrichtechnische Zeitschrift. vol. 40, No. 7, Jul. 1987, Berlin DE pp. 534-536; Jerry Adams: 'Glasfasernetz Für Breitbanddienste in London', 5 pgs. No English Translation Found.

(56) References Cited

OTHER PUBLICATIONS

Avinity Systems B.V., Communication pursuant to Article 94(3) EPC, EP 07834561.8, Jan. 31, 2014, 10 pgs.
Avinity Systems B.V., Communication pursuant to Article 94(3) EPC, EP 07834561.8, Apr. 8, 2010, 5 pgs.
Avinity Systems B.V., International Preliminary Report on Patentability, PCT/NL2007/000245, Mar. 31, 2009, 12 pgs.
Avinity Systems B.V., International Search Report and Written Opinion, PCT/NL2007/000245, Feb. 19, 2009, 18 pgs.
Avinity Systems B.V., Notice of Grounds of Rejection for Patent, JP 2009-530298, Sep. 3, 2013, 4 pgs.
Avinity Systems B.V., Notice of Grounds of Rejection for Patent, JP 2009-530298, Sep. 25, 2012, 6 pgs.
Bird et al., "Customer Access to Broadband Services," ISSLS 86—The International Symposium on Subrscriber Loops and Services Sep. 29, 1986, Tokyo,JP 6 pgs.
Brockmann, Final Office Action, U.S. Appl. No. 13/668,004, Jul. 16, 2014, 20 pgs.
Brockmann, Office Action, U.S. Appl. No. 13/686,548, Mar. 10, 2014, 11 pgs.
Brockmann, Office Action, U.S. Appl. No. 13/668,004, Dec. 23, 2013, 9 pgs.
Brockmann, Office Action, U.S. Appl. No. 13/438,617, May 12, 2014, 17 pgs.
Brockmann, Final Office Action, U.S. Appl. No. 12/443,571, Mar. 7, 2014, 21 pgs.
Brockmann, Office Action, U.S. Appl. No. 12/443,571, Jun. 5, 2013, 18 pgs.
Chang, Shih-Fu, et al., "Manipulation and Compositing of MC-DOT Compressed Video," IEEE Journal on Selected Areas of Communications, Jan. 1995, vol. 13, No. 1, 11 pgs.
Dahlby, Office Action, U.S. Appl. No. 12/651,203, Jun. 5, 2014, 18 pgs.
Dahlby, Final Office Action, U.S. Appl. No. 12/651,203, Feb. 4, 2013, 18 pgs.
Dahlby, Office Action, U.S. Appl. No. 12/651,203, Aug. 16, 2012, 18 pgs.
Dukes, Stephen D., "Photonics for cable television system design, Migrating to regional hubs and passive networks," Communications Engineering and Design, May 1992, 4 pgs.
Ellis, et al., "INDAX: An Operation Interactive Cabletext System", IEEE Journal on Selected Areas in Communications, vol. sac-1, No. 2, Feb. 1983, pp. 285-294.
European Patent Office, Supplementary European Search Report, Application No. EP 09 70 8211, dated Jan. 5, 2011, 6 pgs.
Frezza, W., "The Broadband Solution—Metropolitan CATV Networks," Proceedings of Videotex '84, Apr. 1984, 15 pgs.
Gecsei, J., "Topology of Videotex Networks," The Architecture of Videotex Systems, Chapter 6, 1983 by Prentice-Hall, Inc.
Gobl, et al., "ARIDEM—a multi-service broadband access demonstrator," Ericsson Review No. 3, 1996, 7 pgs.
Gordon, Notice of Allowance, U.S. Appl. No. 12/008,697, Mar. 20, 2014, 10 pgs.
Gordon, Final Office Action, U.S. Appl. No. 12/008,722, Mar. 30, 2012, 16 pgs.
Gordon, Final Office Action, U.S. U.S. Appl. No. 12/035,236, Jun. 11, 2014, 14 pgs.
Gordon, Final Office Action, U.S. U.S. Appl. No. 12/035,236, Jun. 22, 2013, 7 pgs.
Gordon, Final Office Action, U.S. Appl. No. 12/035,236, Sep. 20, 2011, 8 pgs.
Gordon, Final Office Action, U.S. Appl. No. 12/035,236, Sep. 21, 2012, 9 pgs.
Gordon, Final Office Action, U.S. Appl. No. 12/008,697, Mar. 6, 2012, 48 pgs.
Gordon, Office Action, U.S. Appl. No. 12/035,236, Mar. 13, 2013, 9 pgs.
Gordon, Office Action, U.S. Appl. No. 12/035,236, Mar. 22, 2011, 8 pgs.
Gordon, Office Action, U.S. Appl. No. 12/035,236, Mar. 28, 2012, 8 pgs.
Gordon, Office Action, U.S. Appl. No. 12/035,236, Dec. 16, 2013, 11 pgs.
Gordon, Office Action, U.S. Appl. No. 12/008,697, Aug. 1, 2013, 43 pgs.
Gordon, Office Action, U.S. Appl. No. 12/008,697, Aug. 4, 2011, 39 pgs.
Gordon, Office Action, U.S. Appl. No. 12/008,722, Oct. 11, 2011, 16 pgs.
Henry et al. "Multidimensional Icons" ACM Transactions on Graphics, vol. 9, No. 1 Jan. 1990, 5 pgs.
Insight advertisement, "In two years this is going to be the most watched program on TV" on touch VCR programming, published not later than 2000, 10 pgs.
Isensee et al., "Focus Highlight for World Wide Web Frames," Nov. 1, 1997, IBM Technical Disclosure Bulletin, vol. 40, No. 11, pp. 89-90.
ICTV, Inc., International Search Report / Written Opinion, PCT/US2008/000400, Jul. 14, 2009, 10 pgs.
ICTV, Inc., International Search Report / Written Opinion, PCT/US2008/000450, Jan. 26, 2009, 9 pgs.
Kato, Y., et al., "A Coding Control algorithm for Motion Picture Coding Accomplishing Optimal Assignment of Coding Distortion to Time and Space Domains," Electronics and Communications in Japan, Part 1, vol. 72, No. 9, 1989, 11 pgs.
Koenen, Rob,"MPEG-4 Overview—Overview of the MPEG-4 Standard" Internet Citation, Mar. 2001, http://mpeg.telecomitalialab.com/standards/mpeg-4/mpeg-4.htm, May 9, 2005, 74 pgs.
Konaka, M. et al., "Development of Sleeper Cabin Cold Storage Type Cooling System," SAE International, The Engineering Society for Advancing Mobility Land Sea Air and Space, SAE 2000 World Congress, Detroit, Michigan, Mar. 6-9,2000, 7 pgs.
Le Gall, Didier, "MPEG: A Video Compression Standard for Multimedia Applications", Communication of the ACM, vol. 34, No. 4, Apr. 1991, New York, NY, 13 pgs.
Langenberg, E, et al., "Integrating Entertainment and Voice on the Cable Network," SCTE , Conference on Emerging Technologies, Jan. 6-7, 1993, New Orleans, Louisiana, 9 pgs.
Large, D., "Tapped Fiber vs. Fiber-Reinforced Coaxial CATV Systems", IEEE LCS Magazine, Feb. 1990, 7 pgs.
Mesiya, M.F, "A Passive Optical/Coax Hybrid Network Architecture for Delivery of CATV, Telephony and Data Services," 1993 NCTA Technical Papers, 7 pgs.
"MSDL Specification Version 1.1" International Organisation for Standardisation Organisation Internationale EE Normalisation, ISO/IEC JTC1/SC29/WG11 Coding of Moving Pictures and Autdio, N1246, MPEG96/Mar. 1996, 101 pgs.
Noguchi, Yoshihiro, et al., "MPEG Video Compositing in the Compressed Domain," IEEE International Symposium on Circuits and Systems, vol. 2, May 1, 1996, 4 pgs.
Regis, Notice of Allowance U.S. Appl. No. 13/273,803, Sep. 2, 2014, 8 pgs.
Regis, Notice of Allowance U.S. Appl. No. 13/273,803, May 14, 2014, 8 pgs.
Regis, Final Office Action U.S. Appl. No. 13/273,803, Oct. 11, 2013, 23 pgs.
Regis, Office Action U.S. Appl. No. 13/273,803, Mar. 27, 2013, 32 pgs.
Richardson, Ian E.G., "H.264 and MPEG-4 Video Compression, Video Coding for Next-Genertion Multimedia," Johm Wiley & Sons, US, 2003, ISBN: 0-470-84837-5, pp. 103-105, 149-152, and 164.
Rose, K., "Design of a Switched Broad-Band Communications Network for Interactive Services," IEEE Transactions on Communications, vol. com-23, No. 1, Jan. 1975, 7 pgs.
Saadawi, Tarek N., "Distributed Switching for Data Transmission over Two-Way CATV", IEEE Journal on Selected Areas in Communications, vol. Sac-3, No. 2, Mar. 1985, 7 pgs.
Schrock, "Proposal for a Hub Controlled Cable Television System Using Optical Fiber," IEEE Transactions on Cable Television, vol. CATV-4, No. 2, Apr. 1979, 8 pgs.
Sigmon, Notice of Allowance, U.S. Appl. No. 13/311,203, Sep. 22, 2014, 5 pgs.

(56) References Cited

OTHER PUBLICATIONS

Sigmon, Notice of Allowance, U.S. Appl. No. 13/311,203, Feb. 27, 2014, 14 pgs.
Sigmon, Final Office Action, U.S. Appl. No. 13/311,203, Sep. 13, 2013, 20 pgs.
Sigmon, Office Action, U.S. Appl. No. 13/311,203, May 10, 2013, 21 pgs.
Smith, Brian C., et al., "Algorithms for Manipulating Compressed Images," IEEE Computer Graphics and Applications, vol. 13, No. 5, Sep. 1, 1993, 9 pgs.
Smith, J. et al., "Transcoding Internet Content for Heterogeneous Client Devices" Circuits and Systems, 1998. ISCAS '98. Proceedings of the 1998 IEEE International Symposium on Monterey, CA, USA May 31-Jun. 3, 1998, New York, NY, USA,IEEE, US, May 31, 1998, 4 pgs.
Stoll, G. et al., "GMF4iTV: Neue Wege zur-Interaktivitaet Mit Bewegten Objekten Beim Digitalen Fernsehen," Fkt Fernseh Und Kinotechnik, Fachverlag Schiele & Schon GmbH, Berlin, DE, vol. 60, No. 4, Jan. 1, 2006, ISSN: 1430-9947, 9 pgs. No English Translation Found.
Tamitani et al., "An Encoder/Decoder Chip Set for the MPEG Video Standard," 1992 IEEE International Conference on Acoustics, vol. 5, Mar. 1992, San Francisco, CA, 4 pgs.
Terry, Jack, "Alternative Technologies and Delivery Systems for Broadband ISDN Access", IEEE Communications Magazine, Aug. 1992, 7 pgs.
Thompson, Jack, "DTMF-TV, The Most Economical Approach to Interactive TV," GNOSTECH Incorporated, NCF'95 Session T-38-C, 8 pgs.
Thompson, John W. Jr., "The Awakening 3.0: PCs, TSBs, or DTMF-TV—Which Telecomputer Architecture is Right for the Next Generations's Public Network'?," GNOSTECH Incorporated, 1995 The National Academy of Sciences, downloaded from the Unpredictable Certainty: White Papers, http://www.nap.edu/catalog/6062.html, pp. 546-552.
Tobagi, Fouad A., "Multiaccess Protocols in Packet Communication Systems," IEEE Transactions on Communications, vol. Com-28, No. 4, Apr. 1980, 21 pgs.
Toms, N., "An Integrated Network Using Fiber Optics (Info) for the Distribution of Video, Data, and Telephone in Rural Areas," IEEE Transactions on Communication, vol. Com-26, No. 7, Jul. 1978, 9 pgs.
Trott, A., et al."An Enhanced Cost Effective Line Shuffle Scrambling System with Secure Conditional Access Authorization," 1993 NCTA Technical Papers, 11 pgs.
Jurgen_Two-way applications for cable television systems in the '70s, IEEE Spectrum, Nov. 1971, 16 pgs.
va Beek, P., "Delay-Constrained Rate Adaptation for Robust Video Transmission over Home Networks," Image Processing, 2005, ICIP 2005, IEEE International Conference, Sep. 2005, vol. 2, No. 11, 4 pgs.
Van der Star, Jack A. M., "Video on Demand Without Compression: A Review of the Business Model, Regulations and Future Implication," Proceedings of PTC'93, 15th Annual Conference, 12 pgs.
Welzenbach et al., "The Application of Optical Systems for Cable TV," AEG-Telefunken, Backnang, Federal Republic of Germany, ISSLS Sep. 15-19, 1980, Proceedings IEEE Cat. No. 80 CH1565-1, 7 pgs.
Yum, TS P., "Hierarchical Distribution of Video with Dynamic Port Allocation," IEEE Transactions on Communications, vol. 39, No. 8, Aug. 1, 1991, XP000264287, 7 pgs.
AC-3 digital audio compression standard, Extract, Dec. 20, 1995, 11 pgs.
ActiveVideo Networks BV, International Preliminary Report on Patentability, PCT/NL2011/050308, Sep. 6, 2011, 8 pgs.
ActiveVideo Networks BV, International Search Report and Written Opinion, PCT/NL2011/050308, Sep. 6, 2011, 8 pgs.
Activevideo Networks Inc., International Preliminary Report on Patentability, PCT/US2011/056355, Apr. 16, 2013, 4 pgs.
ActiveVideo Networks Inc., International Search Report and Written Opinion, PCT/US2011/056355, Apr. 13, 2012, 6 pgs.
ActiveVideo Networks Inc., International Search Report and Written Opinion, PCT/US2013/020769, May 9, 2013, 9 pgs.
ActiveVideo Networks Inc., International Search Report and Written Opinion, PCT/US2013/036182, Jul. 29, 2013, 12 pgs.
ActiveVideo Networks, Inc., International Search Report and Written Opinion, PCT/US2009/032457, Jul. 22, 2009, 7 pgs.
ActiveVideo Networks Inc. Extended EP Search Rpt, Application No. 09820936-4, 11 pgs.
ActiveVideo Networks Inc. Extended EP Search Rpt, Application No. 10754084-1, 11 pgs.
ActiveVideo Networks Inc. Extended EP Search Rpt, Application No. 10841764.3, 16 pgs.
ActiveVideo Networks Inc. Extended EP Search Rpt, Application No. 11833486.1, 6 pgs.
AcitveVideo Networks Inc., Korean Intellectual Property Office, International Search Report; PCT/US2009/032457, Jul. 22, 2009, 7 pgs.
Annex C—Video buffering verifier, information technology—generic coding of moving pictures and associated audio information: video, Feb. 2000, 6 pgs.
Antonoff, Michael, "Interactive Television," Popular Science, Nov. 1992, 12 pages.
Avinity Systems B.V., Extended European Search Report, Application No. 12163713.6, 10 pgs.
Avinity Systems B.V., Extended European Search Report, Application No. 12163712-8, 10 pgs.
Benjelloun, A summation algorithm for MPEG-1 coded audio signals: a first step towards audio processed domain, 2000, 9 pgs.
Broadhead, Direct manipulation of MPEG compressed digital audio, Nov. 5-9, 1995, 41 pgs.
Cable Television Laboratories, Inc., "CableLabs Asset Distribution Interface Specification, Version 1.1", May 5, 2006, 33 pgs.
CD 11172-3, Coding of moving pictures and associated audio for digital storage media at up to about 1.5 MBIT, Jan. 1, 1992, 39 pgs.
Craig, Notice of Allowance, U.S. Appl. No. 11/178,176, Dec. 23, 2010, 8 pgs.
Craig, Notice of Allowance, U.S. Appl. No. 11/178,183, Jan. 12, 2012, 7 pgs.
Craig, Notice of Allowance, U.S. Appl. No. 11/178,183, Jul. 19, 2012, 8 pgs.
Craig, Notice of Allowance, U.S. Appl. No. 11/178,189, Oct. 12, 2011, 7 pgs.
Craig, Notice of Allowance, U.S. Appl. No. 11/178,176, Mar. 23, 2011, 8 pgs.
Craig, Notice of Allowance, U.S. Appl. No. 13/609,183, Aug. 26, 2013, 8 pgs.
Craig, Final Office Action, U.S. Appl. No. 11/103,838, Feb. 5, 2009, 30 pgs.
Craig, Final Office Action, U.S. Appl. No. 11/178,181, Aug. 25, 2010, 17 pgs.
Craig, Final Office Action, U.S. Appl. No. 11/103,838, Jul. 6, 2010, 35 pgs.
Craig, Final Office Action, U.S. Appl. No. 11/178,176, Oct. 10, 2010, 8 pgs.
Craig, Final Office Action, U.S. Appl. No. 11/178,183, Apr. 13, 2011, 16 pgs.
Craig, Final Office Action, U.S. Appl. No. 11/178,177, Oct. 26, 2010, 12 pgs.
Craig, Final Office Action, U.S. Appl. No. 11/178,181, Jun. 20, 2011, 21 pgs.
Craig, Office Action, U.S. Appl. No. 11/103,838, May 12, 2009, 32 pgs.
Craig, Office Action, U.S. Appl. No. 11/103,838, Aug. 19, 2008; 17 pgs.
Craig, Office Action, U.S. Appl. No. 11/103,838, Nov. 19, 2009, 34 pgs.
Craig, Office Action, U.S. Appl. No. 11/178,176, May 6, 2010, 7 pgs.
Craig, Office-Action U.S. Appl. No. 11/178,177, Mar. 29, 2011, 15 pgs.
Craig, Office Action, U.S. Appl. No. 11/178,177, Aug. 3, 2011, 26 pgs.

(56) References Cited

OTHER PUBLICATIONS

Craig, Office Action, U.S. Appl. No. 11/178,177, Mar, 29, 2010, 11 pgs.
Craig, Office Action, U.S. Appl. No. 11/178,181, Feb. 11, 2011, 19 pgs.
Craig, Office Action, U.S. Appl. No. 11/178,181, Mar. 29, 2010, 10 pgs.
Craig, Office Action, U.S. Appl. No. 11/178,182, Feb. 23, 2010, 15 pgs.
Craig, Office Action, U.S. Appl. No. 11/178,183, Dec. 6, 2010, 12 pgs.
Craig, Office Action, U.S. Appl. No. 11/178,183, Sep. 15, 2011, 12 pgs.
Craig, Office Action, U.S. Appl. No. 11/178,183, Feb. 19, 2010, 17 pgs.
Craig, Office Action, U.S. Appl. No. 11/178,183, Jul. 20, 2010, 13 pgs.
Craig, Office Action, U.S. Appl. No. 11/178,189, Nov. 9, 2010, 13 pgs.
Craig, Office Action, U.S. Appl. No. 11/178,189, Mar. 15, 2010, 11 pgs.
Craig, Office Action, U.S. Appl. No. 11/178,189, Jul. 23, 2009, 10 pgs.
Craig, Office Action, U.S. Appl. No. 11/178,189, May 26, 2011, 14 pgs.
Craig, Office Action, U.S. Appl. No. 13/609,183, May 9, 2013, 7 pgs.
Pavlovskaia, Office Action, JP 2011-516499, Feb. 14, 2014, 19 pgs.
Digital Audio Compression Standard(AC-3, E-AC-3), Advanced Television Systems Committee, Jun. 14, 2005, 236 pgs.
European Patent Office, Extended European Search Report for International Application No. PCT/US2010/027724, dated Jul. 24, 2012, 11 pages.
FFMPEG, http://www.ffmpeg.org, downloaded Apr. 8, 2010, 8 pgs.
FFMEG-0.4.9 Audio Layer 2 Tables Including Fixed Psycho Acoustic Model, 2001, 2 pgs.
Herr, Notice of Allowance, U.S. Appl. No. 11/620,593, May 23, 2012, 5 pgs.
Herr, Notice of Allowance, U.S. Appl. No. 12/534,016, Feb. 7, 2012, 5 pgs.
Herr, Notice of Allowance, U.S. Appl. No. 12/534,016, Sep. 28, 2011, 15 pgs.
Herr, Final Office Action, U.S. Appl. No. 11/620,593, Sep. 15, 2011, 104 pgs.
Herr, Office Action, U.S. Appl. No. 11/620,593, Mar. 19, 2010, 58 pgs.
Herr, Office Action, U.S. Appl. No. 11/620,593, Apr. 21, 2009 27 pgs.
Herr, Office Action, U.S. Appl. No. 11/620,593, Dec. 23, 2009, 58 pgs.
Herr, Office Action, U.S. Appl. No. 11/620,593, Jan. 24, 2011, 96 pgs.
Herr, Office Action, U.S. Appl. No. 11/620,593, Aug. 27, 2010, 41 pgs.
Herre, Thoughts on an SAOC Architecture, Oct. 2006, 9 pgs.
Hoarty, The Smart Headend—A Novel Approach to Interactive Television, Montreux Int'l TV Symposium, Jun. 9, 1995, 21 pgs.
ICTV, Inc., International Preliminary Report on Patentability, PCT/US2006/022585, Jan. 29, 2008, 9 pgs.
ICTV, Inc., International Search Report / Written Opinion, PCT/US2006/022585, Oct. 12, 2007, 15 pgs.
ICTV, Inc., International Search Report / Written Opinion, PCT/US2008/000419, May 15, 2009, 20 pgs.
ICTV, Inc., International Search Report / Written Opinion; PCT/US2006/022533, Nov. 20, 2006; 8 pgs.
Isovic, Timing constraints of MPEG-2 decoding for high quality video: misconceptions and realistic assumptions, Jul. 2-4, 2003, 10 pgs.
MPEG-2 Video elementary stream supplemental information, Dec. 1999, 12 pgs.
Ozer, Video Compositing 101. available from http://www.emedialive.com, Jun. 2, 2004, 5pgs.
Porter, Compositing Digital Images, 18 Computer Graphics (No. 3), Jul. 1984, pp. 253-259.
RSS Advisory Board, "RSS 2.0 Specification", published Oct. 15, 2007. Not Found.
SAOC use cases, draft requirements and architecture, Oct. 2006, 16 pgs.
Sigmon, Final Office Action, U.S. Appl. No. 11/258,602, Feb. 23, 2009, 15 pgs.
Sigmon, Office Action, U.S. Appl. No. 11/258,602, Sep. 2, 2008, 12 pgs.
TAG Networks, Inc., Communication pursuant to Article 94(3) EPC, European Patent Application, 06773714.8, May 6, 2009, 3 pgs.
TAG Networks Inc, Decision to Grant a Patent, JP 209-544985, Jun. 28, 2013, 1 pg.
TAG Networks Inc., IPRP, PCT/US2006/010080, Oct. 16, 2007, 6 pgs.
TAG Networks Inc., IPRP, PCT/US2006/024194, Jan. 10, 2008, 7 pgs.
TAG Networks Inc., IPRP, PCT/US2006/024195, Apr. 1, 2009, 11 pgs.
TAG Networks Inc., IPRP, PCT/US2006/024196, Jan. 10, 2008, 6 pgs.
TAG Networks Inc., International Search Report, PCT/US2008/050221, Jun. 12, 2008, 9 pgs.
TAG Networks Inc., Office Action, CN 200680017662.3, Apr. 26, 2010, 4 pgs.
TAG Networks Inc., Office Action, EP 06739032.8, Aug. 14, 2009, 4 pgs.
TAG Networks Inc., Office Action, EP 06773714.8, May 6, 2009, 3 pgs.
TAG Networks Inc., Office Action, EP 06773714.8, Jan. 12, 2010, 4 pgs.
TAG Networks Inc., Office Action, JP 2008-506474, Oct. 1, 2012, 5 pgs.
TAG Networks Inc., Office Action, JP 2008-506474, Aug. 8, 2011, 5 pgs.
TAG Networks Inc., Office Action, JP 2008-520254, Oct. 20, 2011, 2 pgs.
TAG Networks, IPRP, PCT/US2008/050221, Jul. 7, 2009, 6 pgs.
TAG Networks, International Search Report, PCT/US2010/041133, Oct. 19, 2010, 13 pgs.
TAG Networks, Office Action, CN 200880001325.4, Jun. 22, 2011, 4 pgs.
TAG Networks, Office Action, JP 2009-544985, Feb. 25, 2013, 3 pgs.
Talley, A general framework for continuous media transmission control, Oct. 13-16, 1997, 10 pgs.
The Toolame Project, Psych_nl.c, 1999, 1 pg.
Todd, AC-3: flexible perceptual coding for audio transmission and storage, Feb. 26-Mar. 1, 1994, 16 pgs.
Tudor, MPEG-2 Video Compression, Dec. 1995, 15 pgs.
TVHEAD, Inc., First Examination Report, in 1744/MUMMP/2007, Dec. 30, 2013, 6 pgs.
TVHEAD, Inc., International Search Report, PCT/US2006/010080, Jun. 20, 2006, 3 pgs.
TVHEAD, Inc., International Search Report, PCT/US2006/024194, Dec. 15, 2006, 4 pgs.
TVHEAD, Inc., International Search Report, PCT/US2006/024195, Nov. 29, 2006, 9 pgs.
TVHEAD, Inc., International Search Report, PCT/US2006/024196, Dec. 11, 2006, 4 pgs.
TVHEAD, Inc., International Search Report, PCT/US2006/024197, Nov. 28, 2006, 9 pgs.
Vernon, Dolby digital: audio coding for digital television and storage applications, Aug. 1999, 18 pgs.
Wang, A beat-pattern based error concealment scheme for music delivery with burst packet loss, Aug. 22-25, 2001, 4 pgs.
Wang, A compressed domain beat detector using MP3 audio bitstream, Sep. 30-Oct. 5, 2001, 9 pgs.
Wang, A multichannel audio coding algorithm for inter-channel redundancy removal, May 12-15, 2001, 6 pgs.
Wang, An excitation level based psychoacoustic model for audio compression, Oct. 30-Nov. 4, 1999, 4 pgs.

(56) References Cited

OTHER PUBLICATIONS

Wang, Energy compaction property of the MDCT in comparison with other transforms, Sep. 22-25, 2000, 23 pgs.
Wang, Exploiting excess masking for audio compression, Sep. 2-5, 1999, 4 pgs.
Wang, schemes for re-compressing mp3 audio bitstreams,Nov. 30-Dec. 3, 2001, 5 pgs.
Wang, Selected advances in audio compression and compressed domain processing, Aug. 2001, 68 pgs.
Wang, The impact of the relationship between MDCT and DFT on audio compression, Dec. 13-15, 2000, 9 pgs.
ActiveVideo Networks Inc., Decision to refuse a European patent application (Art. 97(2) EPC, EP09820936.4, Feb. 20, 2015, 4 pgs.
ActiveVideo Networks Inc., Communication Pursuant to Article 94(3) EPC, 10754084.1, Feb. 10, 2015, 12 pgs.
ActiveVideo Networks Inc., Communication under Rule 71(3) EPC, Intention to Grant, EP08713106.6, Feb. 19, 2015, 12 pgs.
ActiveVideo Networks Inc., Notice of Reasons for Rejection, JP2014-100460, Jan. 15, 2015, 6 pgs.
ActiveVideo Networks Inc., Notice of Reasons for Rejection, JP2013-509016, Dec. 24, 2014 (Received Jan. 14, 2015), 11 pgs.
Brockmann, Office Action, U.S. Appl. No. 13/737,097, Mar. 16, 2015, 18 pgs.
Brockmann, Notice of Allowance, U.S. Appl. No. 14/298,796, Mar. 18, 2015, 11 pgs.
Craig, Decision on Appeal—Reversed—, U.S. Appl. No. 11/178,177, Feb. 25, 2015, 7 pgs.
Craig, Notice of Allowance, U.S. Appl. No. 11/178,177, Mar. 5, 2015, 7 pgs.
Craig, Notice of Allowance, U.S. Appl. No. 11/178,181, Feb. 13, 2015, 8 pgs.
ActiveVideo Networks, Inc., International Preliminary Report on Patentablity, PCT/US2013/036182, Oct. 14, 2014, 9 pgs.
ActiveVideo Networks Inc., Communication Pursuant to Rule 94(3), EP08713106-6, Jun. 25, 2014, 5 pgs.
ActiveVideo Networks Inc., Communication Pursuant to Rule 94(3), EP09713486.0, Apr. 14, 2014, 6 pgs.
ActiveVideo Networks Inc., Communication Pursuant to Rules 70(2) and 70a(2), EP11833486.1, Apr. 24, 2014, 1 pg.
ActiveVideo Networks Inc., Communication Pursuant to Rules 161(2) & 162 EPC, EP13775121.0, Jan. 20, 2015, 3 pgs.
ActiveVideo Networks Inc., Examination Report No. 1, AU2011258972, Jul. 21, 2014, 3 pgs.
ActiveVideo Networks, Inc., International Search Report and Written Opinion, PCT/US2014/041430, Oct. 9, 2014, 9 pgs.
Active Video Networks Inc., Notice of Reasons for Rejection, JP2012-547318, Sep. 26, 2014, 7 pgs.
ActiveVideo Networks Inc., Certificate of Patent JP5675765, Jan. 9, 2015, 3 pgs.
Avinity Systems B. V., Final Office Action, JP-2009-530298, Oct. 7, 2014, 8 pgs.
Brockmann, Notice of Allowance, U.S. Appl. No. 13/445,104, Dec. 24, 2014, 14 pgs.
Brockmann, Final Office Action, U.S. Appl. No. 13/686,548, Sep. 24, 2014, 13 pgs.
Brockmann, Office Action, U.S. Appl. No. 12/443,571, Nov. 5, 2014, 26 pgs.
Brockmann, Office Action, U.S. Appl. No. 13/686,548, Jan. 5, 2015, 12 pgs.
Brockmann, Office Action, U.S. Appl. No. 13/911,948, Jan. 29, 2015, 11 pgs.
Dahlby, Office Action, U.S. Appl. No. 12/651,203, Dec. 3, 2014, 19 pgs.
ETSI, "Hybrid Broadcast Broadband TV," ETSI Technical Specification 102 796 V1.1.1, Jun. 2010, 75 pgs.
Gordon, Notice of Allowance, U.S. Appl. No. 12/008,697, Dec. 8, 2014, 10 pgs.
Gordon, Office Action, U.S. Appl. No. 12/008,722, Nov. 28, 2014, 18 pgs.
OIPF, "Declarative Application Environment," Open IPTV Forum, Release 1 Specification, vol. 5, V1.1, Oct. 8, 2009, 281 pgs.
Regis, Notice of Allowance, U.S. Appl. No. 13/273,803, Nov. 18, 2014, 9 pgs.
Schierl, T., et al., 3GPP Compliant Adaptive Wireless Video Streaming Using H.264/AVC, © 2005, IEEE, 4 pgs.
Sigmon, Notice of Allowance, U.S. Appl. No. 13/311,203, Dec. 19, 2014, 5 pgs.
TAG Networks Inc, Decision to Grant a Patent, JP 2008-506474, Oct. 4, 2013, 5 pgs.
Brockmann, Office Action, U.S. Appl. No. 13/668,004, filed Feb. 26, 2015, 17 pgs.
Brockmann, Office Action, U.S. Appl. No. 13/911,948, filed Dec. 26, 2014, 12 pgs.
Regis, Notice of Allowance, U.S. Appl. No. 13/273,803, filed Mar. 2, 2015, 8 pgs.
Brockmann, Notice of Allowance, U.S. Appl No. 13/445,104, Apr. 23, 2015, 8 pgs.
Brockmann, Office Action, U.S. Appl. No. 14/262,674, May 21, 2015, 7 pgs.
Gordon, Notice of Allowance, U.S. Appl. No. 12/008,697, Apr. 1, 2015, 10 pgs.
Sigmon, Notice of Allowance, U.S. Appl. No. 13/311,203, Apr. 14, 2015, 5 pgs.
Avinity-Systems-BV, PreTrial-Reexam-Report-JP2009530298, Apr. 24, 2015, 6 pgs.

\* cited by examiner

REDUCTION OF LATENCY IN VIDEO DISTRIBUTION NETWORKS USING ADAPTIVE BIT RATES

CROSS-REFERENCE TO RELATED APPLICATION

This application claims the benefit of U.S. Provisional Application No. 61/473,085, filed Apr. 7, 2011, the contents of which are herein incorporated by reference in their entirety.

TECHNICAL FIELD

The present invention relates to reducing playback latency in video distribution networks, and more particularly to adjusting an audiovisual encoding bitrate based on a detected network latency using a delay cost function that is indicative of the effect of playback latency on an end user experience.

BACKGROUND ART

Interactive television services provide a television viewer the ability to interact with their television. Such services have been used, for example, to provide navigable menuing systems and ordering systems that are used to implement electronic program guides and on-demand and pay-per-view program reservations without the need to call a television provider. These services typically employ an application that is executed on a server located remotely from the viewer. Such servers may be, for example, located at a cable television headend. The output of the application is streamed to the viewer, typically in the form of an audiovisual MPEG Transport Stream. This allows the stream to be displayed on virtually any client device that has MPEG decoding capabilities, including a television set top box. The client device allows the user to interact with the remote application by capturing keystrokes and passing these back to the application.

The client and the server are, in cable deployments, separated by a managed digital cable-TV network that uses well-known protocols such as ATSC or DVB-C. Here, 'managed' means that any bandwidth resources required to provide these services may be reserved prior to use. Once resources are allocated, the bandwidth is guaranteed to be available, and the viewer is assured of receiving a high-quality interactive application experience.

In recent years, audio-visual consumer electronics devices increasingly support a Local Area Network (LAN) connection, giving rise to a new class of client devices: so-called "Broadband Connected Devices", or BCDs. These devices may be used in systems other than the traditional cable television space, such as on the Internet. For example, consider FIG. 1, in which a client device 110 (such as a Blu-ray player) implements a client application 112 to deliver audiovisual applications streamed over a public data network 120 from an audiovisual application streaming server 130 to a television 140. A user may employ a remote control 142 in conjunction with the client device 110 to transmit interactive commands back to the application streaming server 130, thereby controlling the content interactively.

However, because public data networks are not managed in the same way that private cable systems are, challenges arise. The transport protocols that are commonly used on the open Internet (such as TCP or RTSP) do not support bandwidth reservation. Since bandwidth cannot be guaranteed, the application server is not assured that the network connection can deliver the requested bandwidth. The actual throughput of an Internet connection can vary from second to second depending on many factors, including: network congestion anywhere between the application server and the client device; high-throughput downloads or uploads sharing the same physical internet connection as the client device (e.g. an ADSL line); mechanisms at lower (data link) layers that introduce delay, for example Adaptive Retransmission (ARQ) mechanisms in (wireless) access protocols; lost packets at any link between the client and the server; Transmission Control Protocol (TCP) state and more specifically TCP congestion window size; and reordering of packets caused by any link between the client and the server. To the server streaming the data to the client device, these factors all manifest themselves as fluctuations in actual achieved throughput. Small fluctuations can be addressed by using sufficient buffering, however buffering causes larger end-to-end delays (the time between the moment a user pressing a remote control button, and the moment that the screen update as a result of the key press has been rendered on the user's screen). Delays as short as five seconds may result in an unpleasant viewer experience in some applications such as an electronic program guide, while delays of even one-half second may be extremely noticeable in high-performance gaming applications. Further, the use of such buffering cannot compensate for large fluctuations in throughput.

FIGS. 2-4 illustrate an example of the type of end-to-end playback latency in a typical network system, such as that of FIG. 1, during a transient network outage. There are three sources of playback latency: a server buffer that represents a source of pre-transmission latency; a network buffer that represents transmission latency in the public data network; and a client buffer that represents post-transmission latency in the client device before the audiovisual data are shown. Because of these sources of latency, at a time T1, as the application streaming server 130 generates data for display, the client device 110 is displaying data generated at an earlier time T0. The data that have been generated but not yet viewed are distributed in the three buffers awaiting display. The data themselves are visually represented and discussed in terms of video frames for ease of understanding.

FIG. 2 shows the system operating normally at time T1, just before a network outage occurs between the public data network 120 and the client device 110. FIG. 3 shows the system at a time T2 that is 200 ms later, at the end of the network outage. FIG. 4 shows the system at a time T3 that is another 30 ms later (that is, 230 ms after the start of the outage), after the network has had a chance to transmit some of its buffered data to the client device. These figures are now described in more detail.

More particularly, FIG. 2 shows a server buffer, a network buffer, and a client buffer at a time T1. This network is operating in equilibrium: on average, application server 130 generates one frame of video data in the length of time that each frame of video is displayed on the client device 110 (typically, 1/30 of a second). There are 180 ms of buffered playout data in this Figure: 50 ms in the server buffer, 80 ms in the network buffer, and 50 ms in the client buffer. To be even more specific, the 50 ms of data in the server buffer represent data generated in the 50 ms prior to time T1. Thus, the server buffer contains data spanning the playback range (T1−50 ms, T1), and the first frame of data in the server buffer was generated at time T1−50 ms, as indicated. The data in the network buffer were generated over the 80 ms prior, and therefore span the playback range (T1−130 ms, T1−50 ms). The data in the client buffer were generated over the 50 ms prior, and span the playback range (T1−180 ms, T1−130 ms). Therefore, the display device 140 is playing out the video frame for T0=T1−180 ms from the top of the client buffer.

Assuming that the system continues operating with these latencies, and assuming that the application server can generate a frame instantly in response to user input, a keystroke entered using remote control 142 at time T1 will cause a visible reaction on the display device 140 at time T1+180 ms. That is, the keystroke will have a visible effect as soon as the buffered frames have emptied out of the three buffers onto the display, and the new frame can be displayed. Thus, the system as shown includes a response time of just under two tenths of a second. This delay is barely noticeable for an electronic program guide application.

Continuing the example, suppose a network outage between the network buffer and the client occurs immediately after the time T1, and lasts for 200 ms. At this point, the buffers may appear as in FIG. 3. Here, the client has drained its 50 ms of data, and playout is paused at T1−130 ms. It has been paused there for 150 ms (i.e., the amount of time that has elapsed for which it has not received any data). Meanwhile, the server has generated 200 ms of additional audiovisual data for playback. Based on the particular bandwidths available in the network during the outage, only 110 ms of playback have been sent to the network. Thus, the network buffer has 190 ms of stored data: 110 ms of new data, plus the 80 ms that it had at the beginning of the outage. No data have been sent from the network buffer to the client buffer, so the network buffer has data for 190 ms of playback in the range (T1−130 ms, T1+60 ms). In FIG. 2 the server buffer had data that began at T1−50 ms. In the intervening 200 ms, 110 ms of data have passed through the buffer and 90 ms of data have accumulated there. These 90 ms are in addition to the 50 ms already there, so the server buffer now has 140 ms of playback data. These data span the range (T1+60 ms, T1+200 ms).

The 200 ms of playback generated by the server during the outage have been buffered in the network. The 200 ms of data are split between the server buffer (90 ms of increase) and the network buffer (110 ms of increase). The total non-client buffering has increased from only 130 ms (about ⅛ of a second) to 330 ms (about ⅓ of a second).

Thus, after the outage has been resolved, an additional 200 ms of data will be buffered in the system. This can be seen in FIG. 4, which corresponds to the state of the system 30 ms after the outage. In these 30 ms, the network provided enough bandwidth to the client to transfer 50 ms of playback data, which are seen in the client buffer. These data span the range (T1−130 ms, T1−80 ms). The client has just received enough data to safely resume playback, so playback is resumed at T1−130 ms. Looking at the network buffer, 50 ms of playout data have been sent to the client, but 50 ms of playout data have been received from the server, so the network buffer still has 190 ms of data, now spanning the range (T1−80 ms, T1+110 ms). Meanwhile, the server has generated an additional 30 ms of data and transmitted 50 ms of data to the network, so the server buffer has 120 ms of data spanning the range (T1+110 ms, T1+230 ms).

From these figures it is clear that a buffer underrun at the client can lead to playback latency buildup. The system of FIG. 2 had 130 ms of end-to-end delay, but by the end of FIG. 4 when playback resumed, an additional 230 ms of delay had been introduced into the system. Thus, in FIG. 4, there are 130 ms+230 ms=360 ms of total latency in the system, distributed between the three buffers. This playback latency buildup occurs for each client buffer underrun, and such buildups are cumulative. This is a highly undesirable situation for interactive applications.

The prior art does not adequately solve this problem. The client cannot simply skip individual frames because typical encoding schemes, such as MPEG, may encode each frame based on the data contained in previous and subsequent frames. The client could skip to its next intracoded frame, but these frames may be infrequent, and in any event such a strategy might be jarring for the viewer watching the stream. The server cannot pause frame generation, since it has no indication of the playout problems at the client. A new approach is therefore needed.

SUMMARY OF THE EMBODIMENTS

Various embodiments of the invention optimize playback latency across an unmanaged network as a function of measured network latency and available network bandwidth. Users tolerate variations in playback latency differently for different applications, such as interactive channel menus and program guides, video games, billing systems and the like. Thus, in accordance with various embodiments, these variations are captured in a delay cost function, and playback latency is optimized based on the application. The delay cost function represents, in a way, the effect of playback latency on the user experience.

Ideally, zero latency across all applications would be optimal, but this is not possible in practice because the data network introduces network latencies that are unknown in advance, and uncontrollable by the application. Thus, the systems and methods disclosed herein take measurements of the data network, and adjust playback latency accordingly. In some embodiments, playback latency is adjusted by varying the amount of new frame data being placed into the network for transmission. In others, playback latency is adjusted by notifying the application generating the source data, so that the source data themselves are modified.

Thus, in a first embodiment of the invention there is provided a method of controlling playback latency associated with transmission of source audiovisual data through an unmanaged, buffered data network. The method includes: encoding the source audiovisual data, according to an encoding bitrate, into transmission audiovisual data; transmitting the transmission audiovisual data to a client device through the data network; calculating a delay cost function based on a network latency associated with the data network; and altering the encoding of the source audiovisual data based on the calculated delay cost function.

Encoding may be performed according to an MPEG standard. The client device may be, among other things, a television set top box, a television, a personal computer, a tablet computer, a smartphone, or an optical disc player such as a Blu-ray or DVD player or game console. The unmanaged, buffered data network may be at least one of a cable data network, a broadcast wireless data network, a point-to-point wireless data network, a satellite network, and a portion of the Internet. Or, the unmanaged, buffered data network may be coupled to a managed data network that is capable of providing interactive television signals.

In a related embodiment, transmitting includes dividing the data of each video frame into at least one frame portion. In this embodiment, the method further calls for waiting to receive, from the client device, for each portion, an acknowledgement that the portion has been received by the client device, wherein the delay cost function is based on a length of time ("delay") between the completion of the encoding of a portion and receipt from the client device of the acknowledgement of the portion. The delay cost function may be calculated as $$\text{cost} = \alpha + \lambda^*(\text{delay} - \text{rtt\_min})^\gamma,$$

where α is a number that represents a minimum cost to transmit data, λ is a number that indicates a scaling factor of the delay cost function, γ is a number that indicates a curvature of the delay cost function, and "rtt_min" is a minimum round trip time associated with the data network. In a different embodiment, the bitrate cost is not based on a delay, but based on variation of a round trip time ("rtt") that is associated with the data network. In this case, the delay cost function may be calculated as cost=α+λ*(rtt−rtt_min)$^γ$.

In a further embodiment, transmitting is performed in accordance with the Transmission Control Protocol ("TCP"), and the method calls for calculating an estimated available bandwidth as estimate=8*mss*cwnd/rtt, where "mss" is a TCP Maximum Segment Size, "cwnd" is a TCP Congestion Window Size, and "rtt" is a round trip time associated with the data network. An encoding bitrate is established, and is equal to the value of the ratio of "estimate" to the delay cost function. Altering the encoding of the source audiovisual data may include altering the encoding bitrate to be no greater than the established encoding bitrate. If the source audiovisual data includes source audio data having an audio bitrate and source video frames, altering the encoding of the source audiovisual data may instead include altering a video encoding bitrate so that the sum of the audio bitrate and the video encoding bitrate is no greater than the established encoding bitrate.

In another embodiment, the source audiovisual data are generated by an interactive software application according to the established encoding bitrate, and the method further includes notifying the application that the encoding bitrate has been increased or decreased. The application responds by altering the source audiovisual data that it produces, including adjusting various screen objects and optimizing the generation of dynamic elements. When the established encoding bitrate is lower than a given threshold defined by the application, the application may alter the source audiovisual data by not generating a transparent screen object. If the source audiovisual data include a graphical user interface, then when the established encoding bitrate is lower than a given threshold defined by the application, the application may alter the source audiovisual data by postponing the generation of a dynamic screen region in the graphical user interface. In yet another embodiment, the method includes pausing the encoder when the delay cost function falls below a given threshold.

System embodiments and computer program product embodiments that perform the above methods are also disclosed.

BRIEF DESCRIPTION OF THE DRAWINGS

The foregoing features will be more readily understood by reference to the following detailed description, taken with reference to the accompanying drawings, in which.

DETAILED DESCRIPTION OF SPECIFIC EMBODIMENTS

Figure 1:
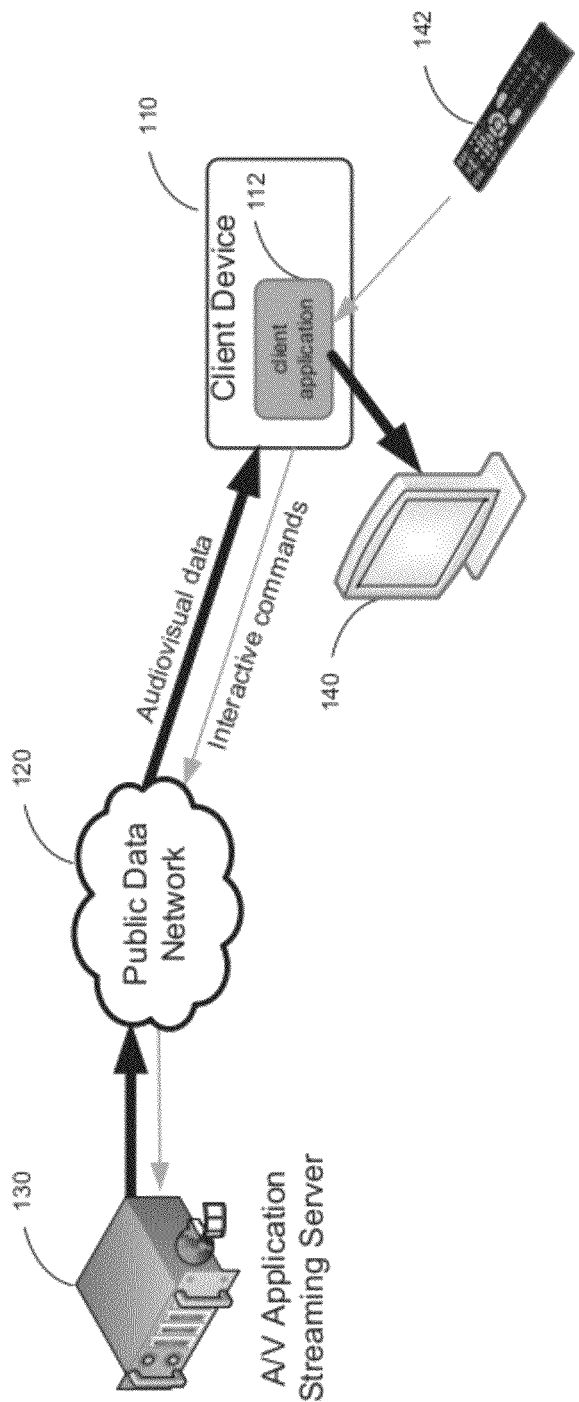
FIG. 1 is a system diagram showing an environment in which some embodiments of the invention may be used.

As used in this description and the accompanying claims, the following terms shall have the meanings indicated, unless the context otherwise requires:

Playback latency refers to a delay, experienced by the user of an interactive audiovisual application displayed on a display device, between an input provided by the user and a reaction of the audiovisual information. In more concrete terms, one kind of playback latency is the time between pressing a "channel menu" key on a television remote control and the actual appearance of the menu on a television screen. Assuming that the application generating the displayed video reacts instantly to the receipt of the key press, the television nevertheless does not react immediately, because some video data is in transit between the application and the television, buffered in various locations. This buffered data represents the playback latency. Playback latency is typically measured in frames of video or audio data.

Network latency refers to a delay resulting from transmission of data through a data network. Because data networks are made of physical components, and because these components can only transmit information at a maximum physical speed, there is a delay caused by the transit time of data through a network. Additionally, if the receiving system cannot receive the data as fast as the sending system is generating it, or for other reasons, the data network itself may buffer data, slowing its transit. These delays give rise to network latency. Network latency is typically measured in milliseconds (ms).

Bandwidth refers to the rate at which data may be transmitted through a data network. Bandwidth is independent of latency. For example, an interplanetary data network may have large network latency but also a high bandwidth, while a serial cable connecting a keyboard to a computer may have a very low latency but also a low bandwidth. Public data networks like the Internet generally strive to have a high bandwidth and a low network latency; that is, the ability to move 'as much data' as possible, 'as quickly' as possible.

A managed data network is one that can guarantee a particular bandwidth will be available. Typical managed networks, such as cable networks based on ATSC or QAM, use bandwidth reservation protocols, such as the Resource Reservation Protocol (RSVP), to guarantee availability. By contrast, an unmanaged data network is one that cannot make such a guarantee. Most public data networks are unmanaged.

Various embodiments of the invention optimize playback latency across an unmanaged network as a function of available network bandwidth and measured network latency. Users tolerate variations in playback latency differently for different applications, such as interactive channel menus and program guides, video games, billing systems and the like. Thus, in accordance with various embodiments, these variations are captured in a delay cost function, one for each application, and playback latency is optimized based on the application.

Ideally, zero latency across all applications would be optimal, but this is not possible in practice because the data network introduces network latencies that are unknown in advance, and uncontrollable by the application. Thus, the systems and methods disclosed herein carefully balance the amount of playback latency generated by a streaming server, as a function of the current state of the network. In particular, these systems take measurements of the data network, and adjust playback latency accordingly. In some embodiments, playback latency is adjusted by varying the amount of new frame data being placed into the network for transmission. In others, playback latency is adjusted by notifying the application that is generating the source data, so that the source data themselves are modified.

In addition to addressing network latency, different embodiments account for variations in the network bandwidth. Audiovisual data are produced at one bitrate, transmitted through the data network at a different and uncontrolled bitrate (namely the instantaneously available network bandwidth), and consumed at a third bitrate. In addition to balancing the playback latency, systems and methods disclosed herein also carefully balance the amount of data being put into the data network against fluctuations in network bandwidth to avoid client data underruns. While client data underruns are preferably avoided, various methods for dealing with them are also discussed.

Figure 5:
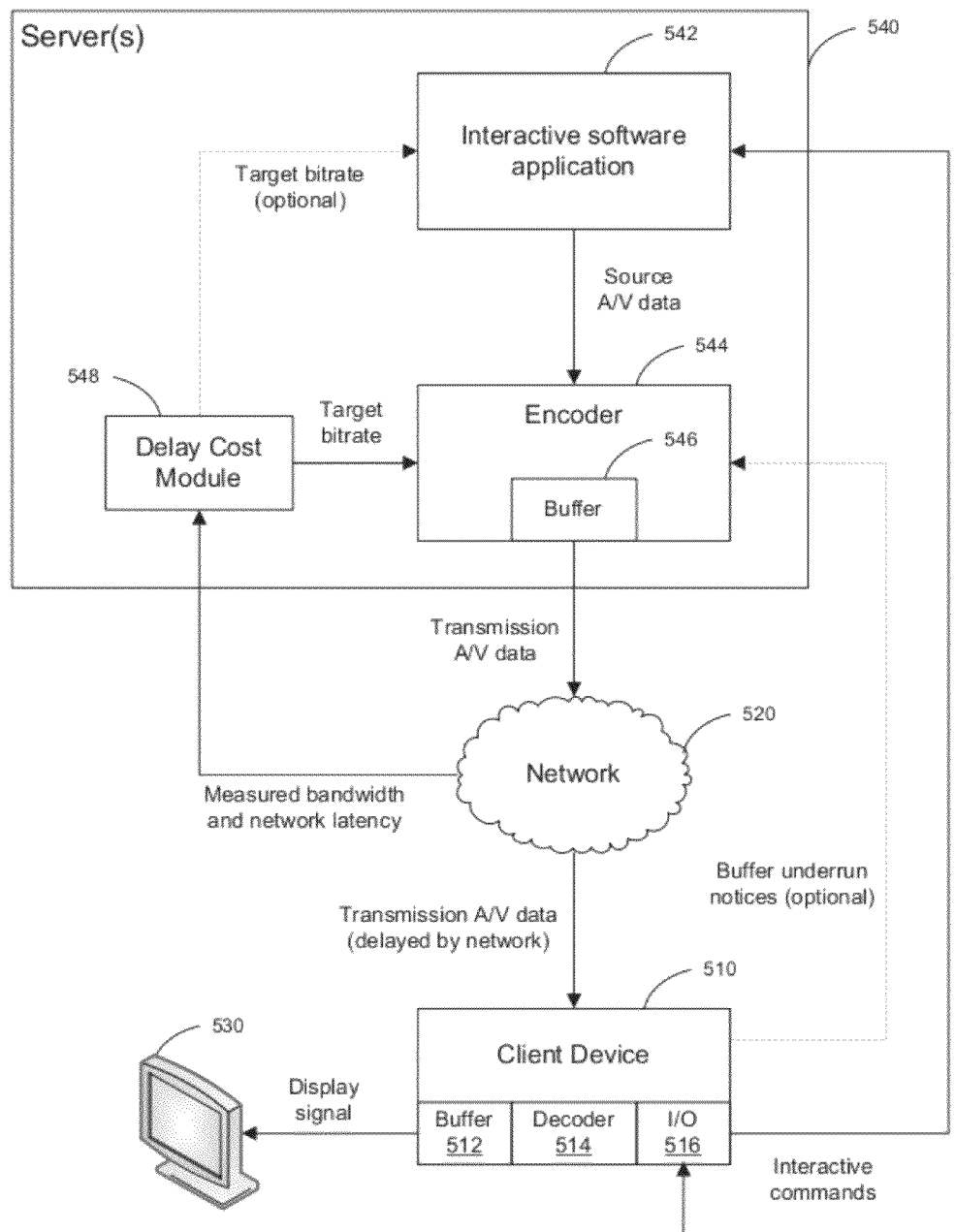
FIG. 5 is a functional diagram showing relevant functional components of a particular embodiment of the invention.

FIG. 5 is a functional diagram showing relevant functional components of a particular embodiment of the invention. Similar to FIG. 1, there is a client device 510, a data network 520, a display device 530, and one or more servers 540 that produce audiovisual data for display on the display device. The audiovisual data may be, for example MPEG encoded data.

The client device 510 may include, among other things, a television set top box, a broadband connected television, a personal computer, a tablet computer, a smartphone, or an optical disc player such as a DVD player or Blu-ray player (either as a standalone unit or as part of a video game console). The client device 510 should be able to receive the audiovisual data and convert it into video and audio signals that may be shown and/or heard on display device 530. Thus, client device may be a 'thin client', as that phrase is known in the art. A buffer 512 in the client device corresponds to the client-buffer of FIGS. 2-4, and is used to delay frames of data until the proper time to transmit them to the display device 530 for immediate display. A decoder 514 receives audiovisual data (which has been encoded according to an encoding, such as MPEG) and decodes it into video and audio data that are placed into the buffer 512. An input/output unit 516 receives user input commands (for example, from a remote control) and transmits them to an interactive software application, in the one or more servers 540, to control the received video and audio. The buffer 512, decoder 514, and I/O unit 516 may be implemented in hardware, software, or a combination of these.

The data network 520 may include a cable data network, a broadcast wireless data network, a point-to-point wireless data network, a satellite network, or a portion of the Internet. In some embodiments, the data network 520 is coupled to a managed data network that is capable of providing interactive television signals to a viewer. Thus, for instance, the data network 520 may be the Internet, and a managed cable television network, including a cable headend, may be interposed between the data network 520 and the client device 510. In this embodiment, the servers 540 are remote from the cable headend, yet are controlled directly by the viewer. This kind of arrangement is described in more detail in U.S. patent application Ser. No. 10/253,109, filed Sep. 24, 2002 and titled "Interactive Cable System with Remote Processors," the contents of which are incorporated herein by reference in their entirety. Alternatively, a managed cable television network may be interposed between the data network 520 and servers 540. This embodiment corresponds, for example, to a situation in which a cable company transmits interactive signals to neighborhood signal distribution nodes, but the nodes themselves aggregate bandwidth to individual homes or businesses in an unmanaged fashion. In this embodiment, data network 520 corresponds to the "last mile" of connectivity, as that phrase is known in the art. In such systems, bandwidth to an individual viewer cannot be guaranteed (managed) as a consequence of performing the aggregation, even if data network 520 is privately owned by the cable company. In a combined embodiment, the server(s) 540 are remote from a cable headend and the last mile is unmanaged, so the system has two sources of unmanaged network latency. Variations of the network topology, in accordance with other embodiments of the invention, may be contemplated by those having ordinary skill in the art. The data network 520 is thus unmanaged, in that bandwidth throughput cannot be guaranteed. The data network 520 is also a source of network latency; represented by the network buffer of FIGS. 2-4.

The display device 530 is configured to convert audiovisual signals into images and sounds. The display device 530 may be, among other things, a television, a computer monitor, or a smartphone display. However, it is not intended to limit the scope of the invention by enumerating these various embodiments, and a person of ordinary skill in the art may see how to adapt other technologies to meet the requirements of the display device 530.

The box 540 denotes a system of one or more computers (servers) that generate transmission audiovisual data in accordance with an embodiment of the invention. The functional components of the element 540 include an interactive software application 542, an encoder 544, and a delay cost module 548. Their representation as a single element does not limit the scope of the invention, as these functional components may be implemented in a variety of hardware and/or software environments using only one computing processor or using multiple processors, or using ASICs or FPGAs.

The interactive software application 542 is a hardware or software component that produces audiovisual data, and alters that audiovisual data in response to receiving interactive commands from the client device 510, as previously described. The application 542 may provide, for example, an electronic program guide or other graphical user interface, a billing system, an authorization mechanism, a video game, a web browser, an email client, a music browsing and purchasing application, Internet access, or another type of interactive application. The source audiovisual data may be raw frames of uncompressed video and/or audio data, or they may be compressed according to a compression algorithm known in the art.

The application 542 sends the source audiovisual data, according to a source bitrate, to an encoder 544. The encoder 544 encodes the source audiovisual data, according to an encoding bitrate, to produce transmission audiovisual data. The transmission audiovisual data are formatted for distribution according to a particular encoding standard, such as MPEG, that the client device 510 (and more particularly, decoder 514) is capable of decoding for playback.

Figure 2:
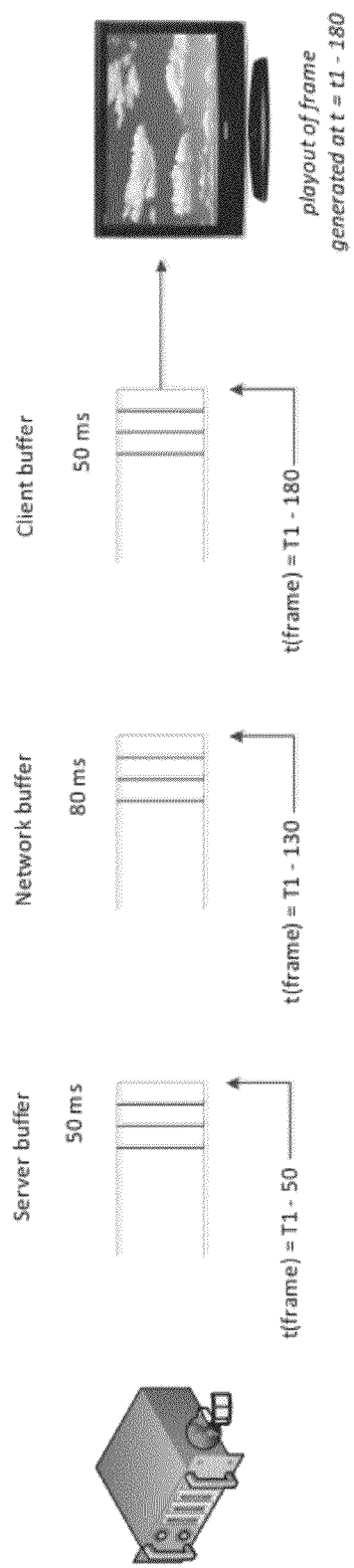
FIG. 2 is a latency diagram showing three sources of end-to-end latency in a typical network system that is performing normally.
Figure 3:
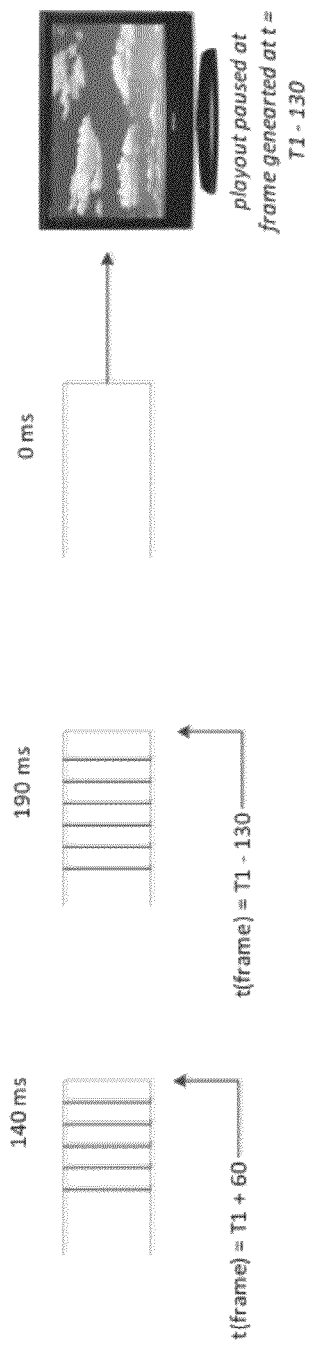
FIG. 3 is a latency diagram showing latencies in the system of FIG. 2 a short time later, after a blockage has developed between the network buffer and the client device.
Figure 4:
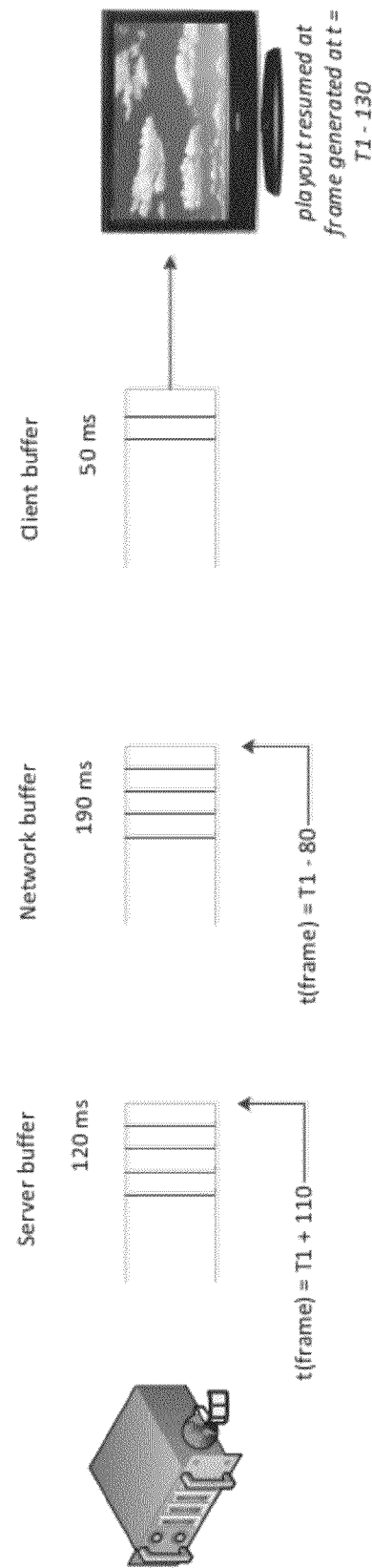
FIG. 4 is a latency diagram showing latencies in the system of FIG. 3 a short time later, after the blockage has been corrected.

Transmission audiovisual data are stored in a transmission buffer 546 that corresponds to the server buffer of FIGS. 2-4. This buffer 546 may be used to store data for transmission in the event that the network 520 has insufficient bandwidth to transmit data at the encoding bitrate used by the encoder 544. Data are added to the buffer 546 at the instantaneous encoding bitrate, and removed from the buffer 546 at the instantaneous network transmission bitrate. A ring buffer may be used for this purpose.

In the case that the encoding output bitrate is greater than the network throughput, buffer 546 stores the data that cannot be transmitted immediately. In general, it is very difficult to determine when sufficient network throughput is available. The underlying transport protocol, which is typically TCP, can best be seen as elastic. That is, when less data is offered to TCP for transmission, it will allow other competing connections to take a larger share. Similarly, when more data is offered to TCP for transmission, it will take more bandwidth. However, TCP cannot take more throughput than it rightfully may claim according to the fair sharing principles that have been built into its algorithms. The only effect that is observable to a server 540 is that when more data is queued for transmission than TCP can allow (as a collective of all connections competing for the same bandwidth), the data will queue up in the transmit buffer.

As will be appreciated by those having skill in the art of video encoding, different frames of video have different sizes based on their content, and sometimes based on the content of other video frames. Thus, the instantaneous encoding bitrate of the encoder 544 may vary over time, and may differ from an established (target) encoding bitrate. Similarly, the instantaneous available bandwidth of network 520 may vary over time. However, as long as buffer 546 does not completely empty, the rate of data being transmitted to data network 520 over time should converge to the established encoding bitrate.

The amount of playback latency in the buffer 546 should be inversely related to the encoding bitrate, for two reasons. First, if the buffer 546 starts to fill up, further queuing should be avoided because it introduces additional playback latency that manifests as 'sluggishness' in the user experience. Second, if the buffer 546 often does not hold any data at all because the data network 520 has extra throughput, then the server(s) 540 should try to grab a bit more bandwidth from other, competing TCP connections in the data network 520 by requesting transmission of playback frames having more data, thereby increasing the visual quality of the video.

Thus, in accordance with various embodiments of the invention, a bitrate control algorithm monitors the amount of data that is queuing up, and establishes the encoding bitrate of encoder 544. The encoding bitrate for the encoder 544 changes as a function of a delay cost, and a delay cost module 548 is employed to calculate this function. The delay cost function may be broadly viewed as a measure of the cost of increased playback latency to an end user experience. This cost varies from one application to the next. Applications for which end users are sharply intolerant of playback latency beyond a small number of frames, such as video games, may have a delay cost function shaped as in FIG. 8 (which is described in more detail below). Applications for which end users are relatively tolerant of delay in response to key presses, such as an interactive program guide, may have a delay cost function shaped as in FIG. 9 (also described below). Returning to FIG. 5, the delay cost module 548 is used to establish an encoding bitrate for the encoder 544 (and, in some embodiments, to interactive software application 542). Thus, as the measured network latency in the network 520 increases, the established encoding bitrate decreases, restricting the flow of new data (and new playback latency) into the system.

Encoding bitrates that are less than the playback bitrate cause new audiovisual data to be produced by the server 540 slower than they are consumed by the client device 510. If this behavior is prolonged, it will cause the buffer 512 to empty. If left uncorrected, this condition will manifest itself on the display device 530 as a frozen image, which may be viewed by an end user as even more unpleasant than excess latency.

Figure 6:
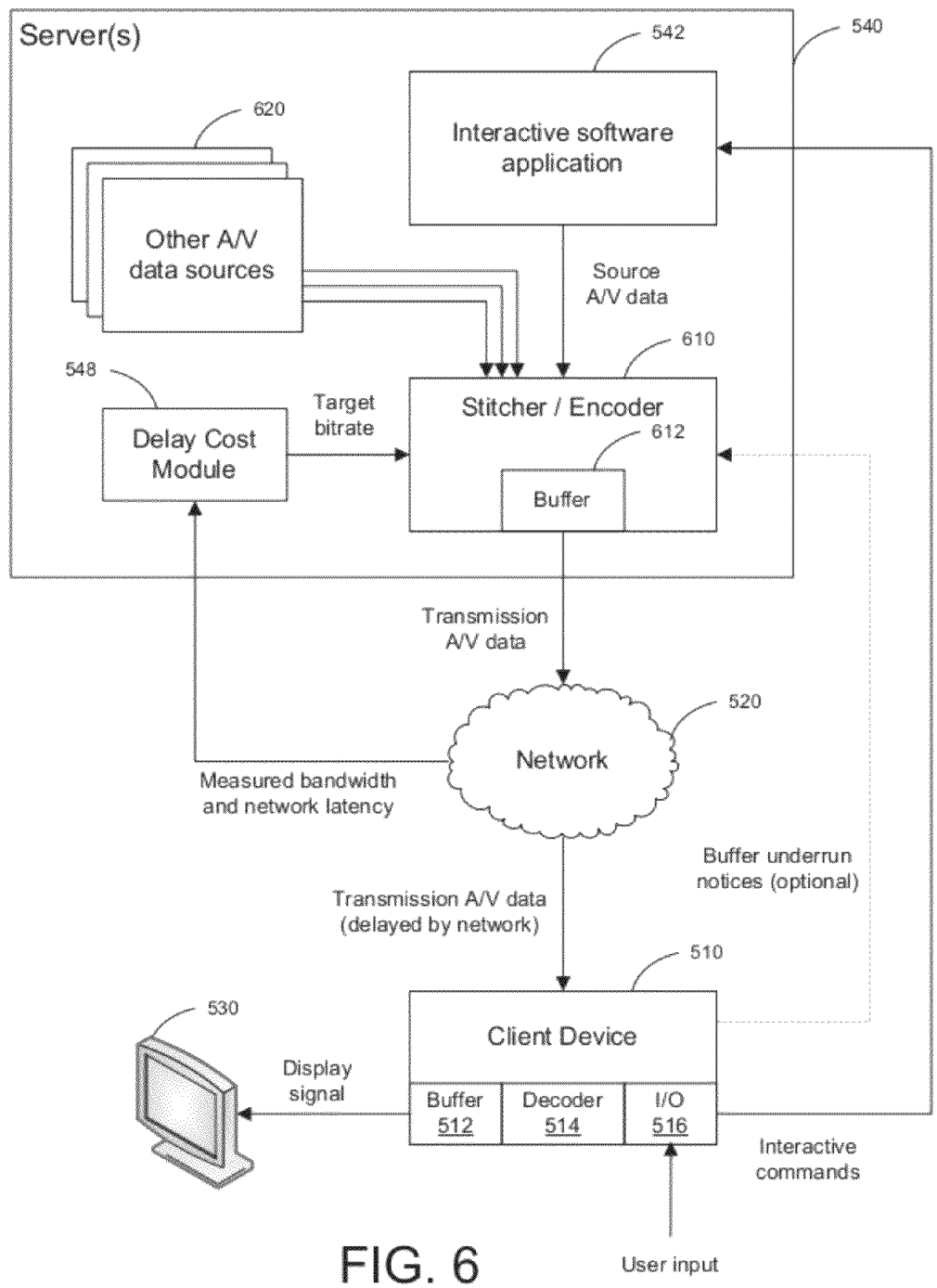
FIG. 6 is a functional diagram showing relevant functional components of an alternate embodiment.

FIG. 6 is a functional diagram showing relevant functional components of an alternate embodiment. This embodiment is similar to that shown in FIG. 5, except that the encoder has been replaced by a stitcher/encoder 610. An example of a stitcher/encoder as known in the art may be found in U.S. patent application Ser. No. 12/008,697, filed Jan. 11, 2008, the contents of which are incorporated herein by reference in their entirety. A stitcher is a hardware or software functional module that acts as a multiplexer of sorts: it stitches several video or audio frames together to form a single output frame. Such stitchers are useful, for example, in an interactive program guide application. In this connection, interactive software application 542 produces a textual or graphical channel listing in response to interactive commands. The stitcher portion of stitcher/encoder 610 combines this listing with the video and/or audio of a channel preview whose data come from other audiovisual data sources 620. The encoder portion of stitcher/encoder 610 then encodes the stitched content according to the target average bitrate, and places it in the buffer 612 for transmission to the data network 520.

Figure 7:
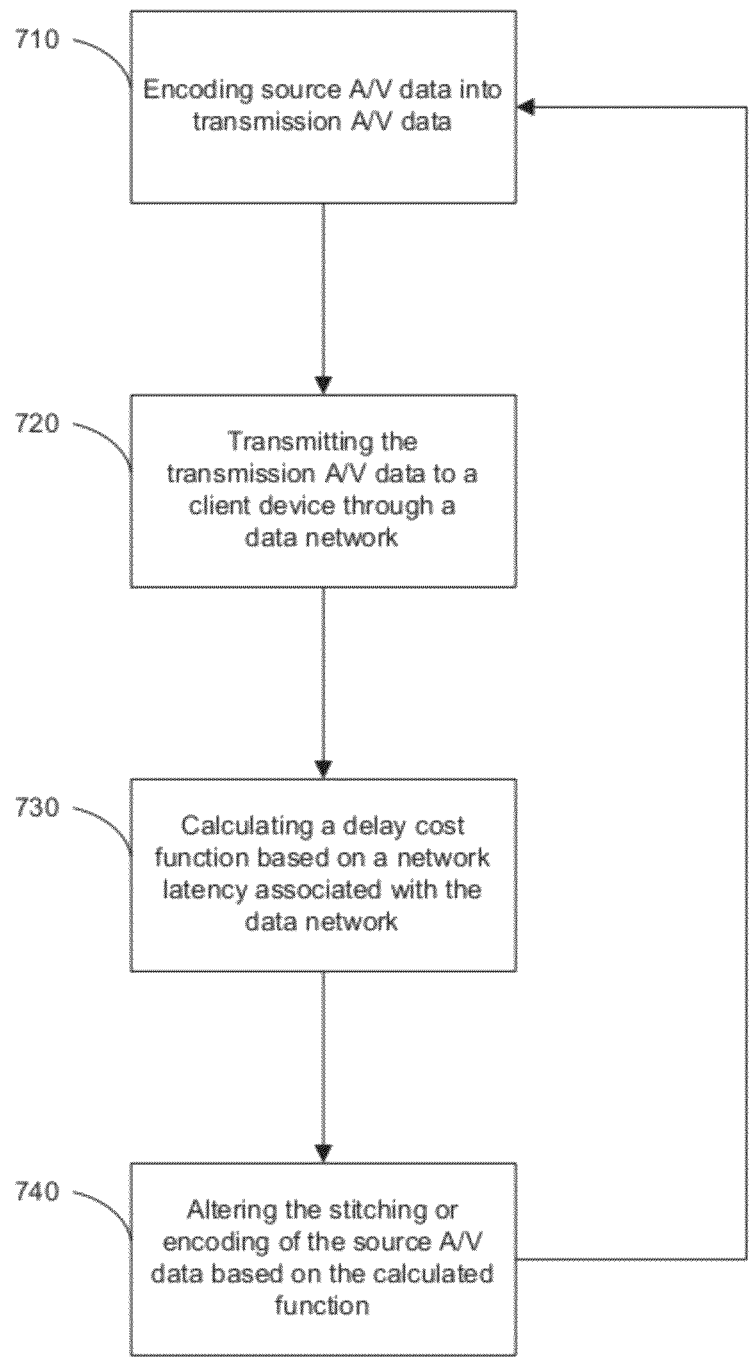
FIG. 7 is a flowchart showing the processes associated with a method of reducing latency in accordance with an embodiment of the invention.

FIG. 7 is a flowchart showing the processes associated with a method of reducing and controlling playback latency in accordance with an embodiment of the invention. Such a flowchart may be, for example, embodied as computer program code that is executed in one or more of the functional modules of FIGS. 5 and 6. In process 710, the method starts with encoding source audiovisual data into transmission audiovisual data. In process 720, the method requires transmitting the transmission audiovisual data to a client device through a data network. Process 730 includes calculating a delay cost function based on a network latency associated with the data network. In process 740, the method requires altering the stitching or encoding of the source audiovisual data based on the calculated delay cost function. As indicated in FIG. 7, these processes may repeat, thereby providing a dynamic method of controlling playback latency in the unmanaged data network.

Figure 8:
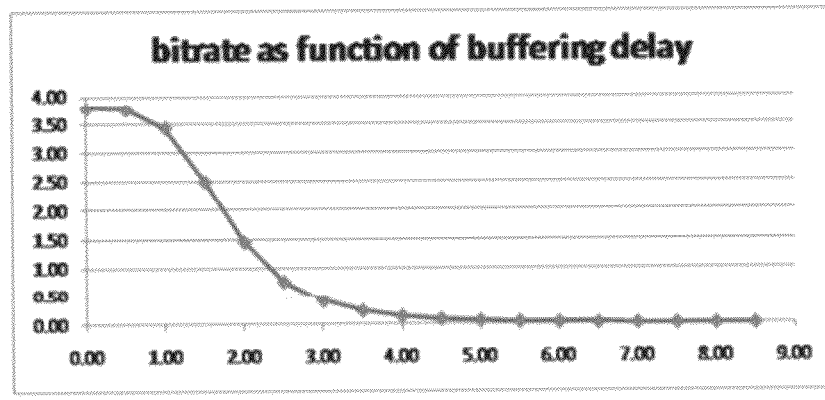
FIG. 8 is a graph of a delay cost function used to respond to detected latency in one embodiment.
Figure 9:
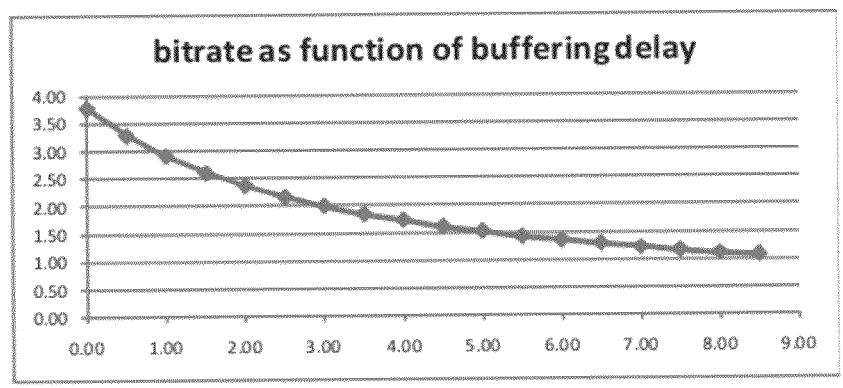
FIG. 9 is a graph of a delay cost function used to respond to detected latency in an alternate embodiment.

Various processes 730 for calculating the delay cost function are now discussed, with reference to FIGS. 8 and 9. FIG. 8 is a graph of a delay cost function used to respond to detected network latency in one embodiment in which a user cannot tolerate much delay. FIG. 9 is a graph of a delay cost function used to respond to detected network latency in an alternate embodiment in which a user is more tolerant of delay.

The delay cost is a function of actual network latency, which may be measured using a number of different techniques. As is known in the art, TCP sends data in packets of a limited size. Therefore, when an application attempts to send more data than can be sent at once, the TCP sender breaks the data into sequenced packets, and sends the packets in sequence. The TCP receiver then acknowledges packets based on the sequence. MPEG video frames are often larger than the TCP packet size, so frames are often broken into multiple packets for transmission.

In one embodiment, the network latency is calculated in terms of MPEG video frame portions. Server(s) 540 divide the data of each video frame into at least one frame portion, but often into many portions. Each frame portion is transmitted to the data network 520 as a TCP packet, and eventually reaches the client device 510 which acknowledges it. The server(s) 540 wait to receive, from the client device, the acknowledgement for each frame portion sent through the network.

In this embodiment, the delay cost function is based on a length of time between the completion of the encoding of a frame portion and receipt of the acknowledgement of the frame portion (as a packet). This length of time is called the "delay". To calculate the delay, a list of all TCP packets having MPEG frame data is maintained, and packets that have not been acknowledged by the client TCP stack are counted toward the network latency measure. Frames for which no packets have been acknowledged add their full playout length (e.g. 1/30 of a second) to the network latency. A frame for which some packets have been acknowledged but not others is counted as a fraction of its full playout length, based on the number of bytes required to transmit that given frame and the number of bytes in the unacknowledged packets. As some frames require more data to encode than others, this calculation will differ from one frame to the next.

Once the delay has been calculated, the delay cost may be calculated. In one embodiment, the delay cost has the formula cost=$\alpha+\lambda*(delay-rtt)^{\gamma}$. Here, rtt is the round trip time measured for the data network 520, discussed above. In some embodiments, the overall minimum round trip time rtt_min is used instead of the instantaneously measured round trip time rtt. The term (delay−rtt) represents the buffering delay at the server side, while the term (delay−rtt_min) represents this delay plus an amount of buffering (rtt−rtt_min) that is attributable to network delay. In some embodiments, this term (in either form) may be divided by a characteristic time, such as rtt or rtt_min, so that it becomes a dimensionless number prior to exponentiation. The minimum round-trip time is accepted as a given—it consists of network buffers and propagation delay that the server cannot control.

The shape of the cost function ensures that as the sender buffering delay increases, the server's generated bitrate is decreased. The parameter $\alpha$ specifies an offset with respect to the TCP estimated bitrate, and represents a minimum cost to transmit data. Selecting a value for $\alpha$ that is less than 1.0 will cause the server bitrate to be higher than the estimated available bitrate, which is useful to get TCP to 'stretch up' its maximum bandwidth. The positive parameter $\lambda$ specifies a scaling factor, to allow the buffering delay to have a larger effect on the resulting bitrate. The parameter $\gamma$ determines the shape of the cost function, and in particular its curvature. A $\gamma$ value of 1.0 will provide a linear cost, so the target output bandwidth response will be purely hyperbolic. A $\gamma$ value higher than 1.0 creates a steeply falling target bandwidth curve (and a more rapid response to detected network latency). Conversely, a $\gamma$ value lower than 1.0 provides a more gradual response to detected network latency.

For example, FIG. 8 is a graph of a delay cost function used by the system to respond to detected network latency in one embodiment in which a user cannot tolerate much playback latency. For example, this curve may represent user tolerance in a video game application. This particular curve corresponds to an instantaneous estimated TCP bitrate of 3.75 Mbps, delay measured in tenths of a second, with $\alpha=1, \lambda=0.1$, and $\gamma=4$. Thus, when the network is performing optimally with zero delay, the target output bitrate is 3.75 Mbps. When there is 0.1 s of delay detected, the target output bitrate is 3.50 Mbps, because this level of latency is still acceptable. But when delay rises to 0.2 s, the target output bitrate has fallen drastically to about 1.50 Mbps, and by 0.4 s of delay, the transmission of new data has virtually stopped. Thus, fewer data accumulate in the server buffer than before the bitrate reduction, but they will be timelier. This reduction in bitrate results in continued high responsiveness to user inputs, even if the quality of the resulting video is degraded. In an application that is intolerant of high playback latency, this is the proper tradeoff.

By contrast, FIG. 9 is a graph of a delay cost function used to respond to detected network latency in an alternate embodiment in which a user is more tolerant of playback latency, such as an interactive program guide. The instantaneous estimated TCP bitrate is still 3.75 Mbps, but now $\alpha=1$, $\lambda=0.3$, and most importantly, $\gamma=1$. Since $\gamma=1$, the curve has a hyperbolic shape, and the response to delay is more gradual. When 0.1 s of delay is detected, the target output bitrate has fallen off to 2.90 Mbps. At 0.2 s of delay, however, the target output bitrate is still at 2.40 Mbps, and at 0.4 s of delay the bitrate is at 1.75 Mbps. These latter two numbers are much higher than in the previous example, because an end user of this application is much more tolerant of playback latency.

The algorithm discussed above does not take into account TCP's round-trip time (rtt) variations. On some occasions, especially when the data network has large network buffers, the observed round-trip time can become orders of magnitude larger than the minimum round-trip time rtt_min that is associated with the network. This is undesired since the rtt adds to the end-to-end network latency. Therefore, an alternate embodiment uses a cost function based on the instantaneous round-trip time, rather than the delay value calculated from MPEG frames. Thus, the delay cost function for this embodiment has the formula cost=$\alpha+\lambda*(rtt-rtt\_min)^{\gamma}$, where $\alpha$, $\lambda$, and $\gamma$ are selected accordingly.

Various processes 740 of altering the encoding of the source audiovisual data are now discussed. In general, there are two different ways to alter the encoding of the source audiovisual data: to change the encoding bitrate, and to change the source audiovisual data themselves. These approaches are explained in turn.

Generally speaking, the established encoding bitrate for the encoder is expressed as a ratio between an estimated available bandwidth and the delay cost function that corresponds to the currently measured latency. If TCP is used, the actual available bandwidth is unknown (i.e., TCP is "unmanaged"), although other protocols may be used that give an exact measure of available bandwidth. One formula for providing a TCP estimated bandwidth is estimate=8*mss*cwnd/rtt, where "mss" is the TCP maximum segment size, "cwnd" is the TCP congestion window size, and "rtt" is a round trip time associated with the data network. The value of rtt may be measured using tools known in the art, such as the packet acknowledgement (ACK) mechanism. This formula operates on the principle that as network round trip time increases, TCP will buffer more data in its congestion window, and vice versa. As TCP stores data in bytes, multiplication by eight is necessary to yield a bitrate.

The actual reduction in encoder bitrate may be achieved in one of two ways. If the source audiovisual content is being encoded for the first time, the established encoding bitrate is passed directly to the encoder, which will encode the source audiovisual content accordingly. However, if the source data were pre-encoded, then the encoder will typically have access to a selection of different bitrates for the particular audiovisual content. When establishing a lower encoding bitrate, the playback latency in the server buffer is quantized, and each time a new quantized value is reached the next lower bitrate stream is selected. When establishing a higher bitrate, if a certain percentage of consecutive frames have been displayed on time, then the next higher bitrate stream is selected. The percentage is configurable to make the algorithm more 'adventurous'. For example, a particular video stored for on-demand playback may be pre-encoded at bitrates of 0.5 Mbps, 1.0 Mbps, and 2.0 Mbps, shown in FIG. 6 as data sources 620. Then, if the encoding bitrate is established at 1.5 Mbps, the stitcher/encoder 610 may stitch the 1.0 Mbps source data into the transmission audiovisual data stream, rather than the 2.0 Mbps source data. If the established encoding bitrate falls below 0.5 Mbps, or another given threshold, the encoder may be paused, so that no more data accumulate in the output buffer at all. By contrast, when the established encoding bitrate increases again above 2.0 Mbps, and (say) at least 75% of the frames were transmitted and displayed on time, the stitcher/encoder 610 may revert to using the higher-bitrate source data.

More subtle bitrate manipulations may be performed in other embodiments. For example, the source audiovisual data may include both audio and visual data, each having their own, separate bitrate. When the established encoding bitrate is reduced or increased, an encoder may reduce or increase the encoding bitrate of only the video portion of the source audiovisual data, while leaving the audio bitrate intact. If the video encoding bitrate is reduced enough, then the sum of the audio bitrate and the (reduced) video encoding bitrate may be no greater than the established encoding bitrate. In this way, a lower (or higher) target may be met without switching between two streams that have vastly different bitrates (and markedly different video qualities), as was discussed above. Further, by maintaining a constant audio bitrate, one may establish a more precise encoding bitrate by determining a more accurate estimate of the available bandwidth in the data network 520. Systems and methods for doing so are taught in U.S. application Ser. No. 12/651,203, filed Dec. 31, 2009, the contents of which are incorporated herein by reference in their entirety.

Turning to a second way of altering the encoding of the source audiovisual data, in some embodiments of the invention, the source audiovisual data themselves are adapted to changing bitrates. This method of content adaptation corresponds to the dashed line in FIG. 5, whereby the delay cost module 548 notifies the interactive software application 542 that a new encoding bitrate has been established. In such embodiments, the interactive software application 542 responds not just to interactive commands from an end user, but also to changes in the encoding bitrate. In these embodiments, the application 542 creates source audiovisual data that may be encoded using a lower (or higher) bitrate, thereby cooperating with the encoder 544 that is trying to determine the best way to respond to the same, lower (or higher) established bitrate.

When an application is requested to generate a lower bitrate stream while maintaining high quality video, it can choose alternate video properties that require fewer bits to encode. This choice can still lead to satisfactory and attractive results, depending on the codec that is used for a given session. If MPEG is used, new screen elements are generally more expensive in terms of bitrate than moving elements, due to efficient encoding of motion vectors. Other seemingly simple effects, such as a fade in from black, are expensive (in MPEG2) because there is no compression primitive for recoloring or weighted prediction. However, MPEG4 has more facilities that allow such richer effects at low cost.

To reduce the encoding bitrate of the source audiovisual data to match the established target, the interactive software application 542 may use one or more of the following strategies. If it is generating a graphical user interface (GUI), it may select a less rich UI element. For example, instead of a cross-fade, fade-in from black or other color, the application 542 can generate the final element at once. Or the application can slide an object into view from the screen edge, rather than draw it all at once. Similarly, instead of an image having an alpha channel that smoothly blends into the background around the edges, an application can use a differently authored layout having an image without alpha channels (with smooth edges but no blending to the background). In this latter embodiment, a transparent or translucent screen object is not generated, in favor of an opaque object that requires fewer bits to encode.

An alternate strategy consists of postponing the production of selected screen regions until a later frame, if there are many updates in one frame and much fewer in later frames. For example, a GUI that includes a collection of buttons and a dynamic element (such as a channel preview) might update the dynamic element every other frame. While this reduces the effective frame rate of the dynamic element, it also reduces the actual size of the transmission audiovisual data. Another strategy includes showing only the end result (last frame) of an animation. Yet another strategy is to design a GUI background image to be a solid color rather than a complex pattern, to avoid having to re-render and retransmit the complex pattern when a pop-up window is removed from the screen. As a final strategy, for extremely low target average bitrates, the application could provide the source audiovisual data as a slideshow of images (i.e., JPEG or PNG images) rather than an MPEG stream.

Figure 10:
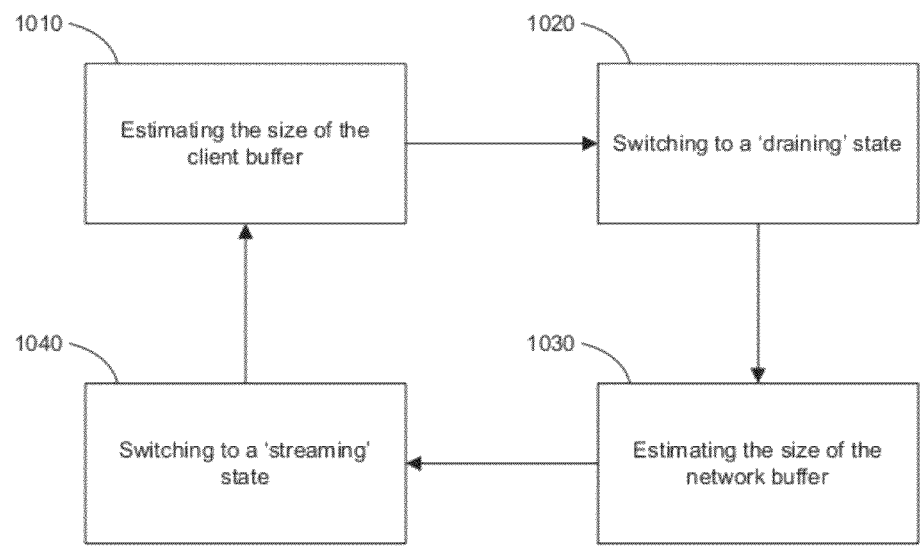
FIG. 10 is a flowchart showing four processes associated with a method of detecting a client buffer underrun in another embodiment.

There is another process 740 that may be employed, used when an underrun in the client buffer 512 underrun occurs. The use of the delay cost function described above is meant to avoid an actual client buffer underrun; thus, when one actually occurs, other measures are required. The alternative process 740 generally includes a cycle of four sub-processes that are shown in FIG. 10. The first process 1010 of the cycle involves estimating the size of the client buffer, and is described in more detail below. When the client buffer is estimated to be empty, the second process 1020 transitions from a 'streaming' state to a 'draining' state. This process includes pausing the encoder, as described above, to allow the network buffer to drain its playback latency. The third process 1030 estimates the size of the network buffer, and is described in more detail below. When the network buffer is estimated to be empty, the system is again ready to accept more playback latency, and the fourth process 1040 switches from the 'draining' state to the 'streaming' state. This process 1040 includes unpausing the encoder. The system shortly reaches equilibrium, and the cycle begins again.

There are two ways that the first process 1010 can detect a client buffer underrun, namely with or without direct client notice. Returning to FIGS. 5 and 6, in some embodiments, the client device 510 includes logic to detect the existence or approach of a buffer underrun condition. This condition manifests itself, in a different context, in the familiar "buffering" message shown in some video players. When the condition is detected, the client device 510 signals the encoder 544 (or stitcher/encoder 610) to indicate that corrective measures are urgently required. This notice is shown by a dashed line in FIGS. 5 and 6. When the client device 510 later signals that the buffer underrun has been cured, the encoder 542 unpauses to permit new data to reach the client.

In other embodiments, however, the client device 510 is unable to signal these underrun events, due to the modularity of software and shielding of software internals from developers. For example, often a set top box or a Blu-ray player incorporates a video decoding ASIC or system-on-chip, along with a software development kit (SDK) for the decoder. The SDK contains tools and software libraries to build a working product. Often the manufacturer of the client device can only access the ASIC via an application programming interface (API) that is provided with the SDK. If the API does not allow buffer underrun events to be signaled to other software modules, then this signal also cannot be sent from the client device 510 to the server.

In embodiments in which a client device 510 cannot signal an underrun in buffer 512 directly, the server estimates a buffer underrun event at the client. In one embodiment, the server(s) 540 detect when the server buffer is has more data than a given threshold. Based on the particular delay cost function used, the given threshold indicates that a network outage has occurred. If dynamic video is streamed, the threshold is set to a value that permits some server-side latency, because responsiveness to user input is not the overriding concern. However, if a user interface is streamed, the threshold is preferably set to zero. Thus, an interactive application will mostly remain in the 'draining' state, with no server-side playback latency. Furthermore, when draining occurs while streaming a user interface, the application 542 is not paused. This ensures minimum playback latency while the user is actively operating the application. Since no moving pictures are displayed, any 'hiccup' or stutter that would otherwise be noticed is not relevant here.

In one MPEG embodiment that does not rely on a buffer measure, the system uses the Program Clock Reference (PCR) with the Decoding Time Stamp (DTS) or Presentation Time Stamp (PTS). As is known in the art, the PCR is a datum in an MPEG-2 transport stream that provides a timestamp associated with the encoder's model of the presentation. The timestamp is used by the decoder 514 as a reference against which the other two timestamps are judged. The DTS provides a marker relative to the PCR that indicates a correct decoding time of a given audio or video frame, while the PTS indicates the correct playback time.

Figure 11:
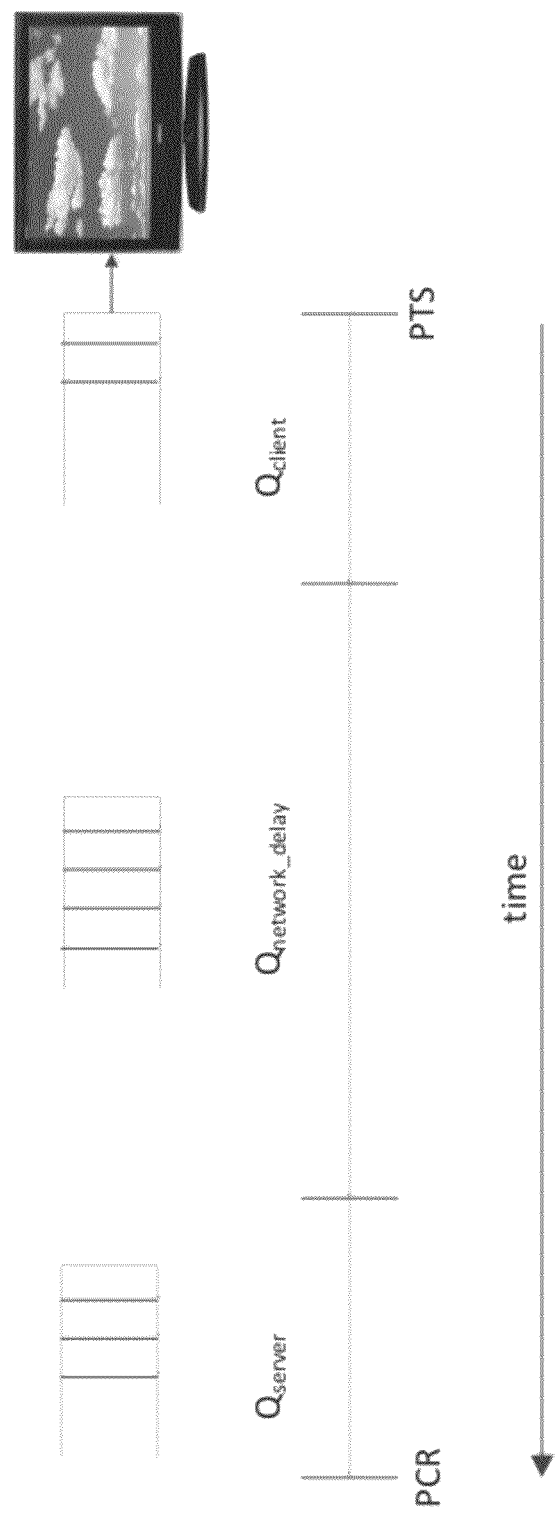
FIG. 11 shows the relationship between two timestamps used to detect the client buffer underrun.

The relation between PCR and PTS in an ideal situation is shown in FIG. 11. Here, the encoder is encoding data using a playback latency of PTS−PCR. This value is equal to the end-to-end network latency, so the PTS time in the client device occurs just as the frame that should be displayed at that time arrives at the top of the client buffer. In prior art managed networks, the difference PTS−PCR is usually fixed, and is chosen based on a priori knowledge of (controllable) network latencies in the network path. Client devices often use PCR as a reference to determine playout timing in cable networks with fixed delay, but not when streaming over the open Internet. The use of the PTS in a public data network in this embodiment is advantageous, because it permits the detection of client buffer underruns in thin clients without explicit signaling, thus solving a different problem than its customary use for controlling display timing.

In this embodiment, the server detects a client underrun if the DTS or PTS for a frame has passed, but acknowledgement was not received for the last TCP packet of that frame. At the moment the DTS occurs, the client decoder 514 will be attempting to decode a particular frame to place in the buffer 512. Similarly, when the PTS occurs, the client device 510 will be attempting to display that frame. However, if the frame has not yet even been received by the client (as indicated by lack of packet acknowledgment), then the client buffer 512 must be empty or critically low. This condition may be detected by the server(s) 540, which may take corrective action even without receiving a signal from the client device 510 that a buffer underrun has occurred.

Corrective measures taken by a system that employs this method need not be limited to just pausing the encoder. When an underrun has occurred, the server may set a larger PTS−PCR difference, to allow the system more time to transfer the frames through the server, network, and client buffers. However, doing so would increase end-to-end playback latency. To reduce this playback latency, the server may receive buffer occupancy reports from the client. If the client buffer level is consistently above a certain threshold, then the server reduces the PTS−PCR difference accordingly.

The embodiments of the invention described above are intended to be merely exemplary; numerous variations and modifications will be apparent to those skilled in the art. All such variations and modifications are intended to be within the scope of the present invention as defined in any appended claims.

It should be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

The aforementioned computer program logic and programmable logic may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

What is claimed is:

1. A method of controlling playback latency associated with transmission of source audiovisual data through an unmanaged, buffered data network, the method comprising:
at a server system coupled to a client device through the data network:
encoding a first portion of the source audiovisual data into a first portion of transmission audiovisual data at a first encoding bitrate; buffering the first portion of transmission audiovisual data; transmitting the first portion of transmission audiovisual data to the client device through the data network;
calculating a delay cost function based on a delay associated with the buffering and with network delay, raised to a power, scaled by a scaling factor, and added to a minimum cost to transmit data;
altering an encoding bitrate from the first encoding bitrate to a second encoding bitrate based on the calculated delay cost function; encoding a second portion of the source audiovisual data into a second portion of transmission audiovisual data at the second encoding bitrate; buffering the second portion of transmission audiovisual data; and transmitting the second portion of transmission audiovisual data to the client device through the data network.

2. The method of claim 1, wherein encoding the first and second portions of the source audiovisual data is performed according to an MPEG standard.

3. The method of claim 1, wherein the client device comprises at least one of a television set top box, a television, a personal computer, a tablet computer, a smartphone, and an optical disc player.

4. The method of claim 1, wherein the unmanaged, buffered data network includes at least one of a cable data network, a broadcast wireless data network, a point-to-point wireless data network, a satellite network, and a portion of the Internet.

5. The method of claim 1, wherein the unmanaged, buffered data network is coupled to a managed data network that is capable of providing interactive television signals.

6. The method of claim 1, wherein transmitting the first and second portions of transmission audiovisual data includes dividing the data of each video frame into at least one frame portion, the method further comprising:
waiting to receive, from the client device, for each frame portion, an acknowledgement that the frame portion has been received by the client device, wherein the delay cost function is calculated using a length of time between the completion of the encoding of a frame portion and receipt from the client device of the acknowledgement of the frame portion.

7. The method of claim 1, wherein transmitting the first and second portions of transmission audiovisual data is performed in accordance with the Transmission Control Protocol (hereinafter "TCP"), further comprising calculating an estimated available bandwidth as $$\text{estimate} = 8 * \text{mss} * \text{cwnd} / \text{rtt},$$

where "mss" is a TCP Maximum Segment Size, "cwnd" is a TCP Congestion Window Size, and "rtt" is a round trip time associated with the data network; and establishing the second encoding bitrate as being equal to the value of the ratio of "estimate" to the delay cost function.

8. The method of claim 1, wherein transmitting the first and second portions of transmission audiovisual data is performed in accordance with the Transmission Control Protocol (hereinafter "TCP"), further comprising calculating an estimated available bandwidth as $$\text{estimate} = 8 * \text{mss} * \text{cwnd} / \text{rtt},$$

where "mss" is a TCP Maximum Segment Size, "cwnd" is a TCP Congestion Window Size, and "rtt" is a round trip time associated with the data network; and establishing the second encoding bitrate as being equal to the value of the ratio of "estimate" to the delay cost function;
wherein the source audiovisual data includes source audio data having an audio bitrate and source video frames having a video encoding bitrate, and the altering includes altering the video encoding bitrate so that the sum of the audio bitrate and the video encoding bitrate is no greater than the second encoding bitrate.

9. The method of claim 1, wherein the source audiovisual data are generated by an interactive software application according to encoding bitrates including the first and second encoding bitrates, the method further comprising notifying the application of the altering.

10. The method of claim 9, wherein, when the second encoding bitrate is lower than a given threshold defined by the application, the application alters the source audiovisual data by not generating a transparent screen object.

11. The method of claim 9, wherein the source audiovisual data include a graphical user interface, and wherein when the second encoding bitrate is lower than a given threshold defined by the application, the application alters the source audiovisual data by postponing the generation of a dynamic screen region in the graphical user interface.

12. The method of claim 1, further comprising pausing the encoder when the value of the delay cost function falls below a given threshold.

13. A non-transitory computer-usable data storage medium on which is stored computer program code for instructing a server system, that comprises at least one computing processor, to execute a method of controlling playback latency associated with transmission of source audiovisual data through an unmanaged, buffered data network to a client device, the program code comprising:
program code for encoding a first portion of the source audiovisual data into a first portion of transmission audiovisual data at a first encoding bitrate;
program code for buffering the first portion of transmission audiovisual data; program code for transmitting the first portion of transmission audiovisual data to the client device through the data network;

program code for calculating a delay cost function based on a delay associated with the buffering and with network delay, raised to a power, scaled by a scaling factor, and added to a minimum cost to transmit data a network latency associated with the data;

program code for altering an encoding bitrate from the first encoding bitrate to a second encoding bitrate based on the calculated delay cost function;

program code for encoding a second portion of the source audiovisual data into a second portion of transmission audiovisual data at the second encoding bitrate;

program code for buffering the second portion of transmission audiovisual data; and program code for transmitting the second portion of transmission audiovisual data to the client device through the data network.

14. The non-transitory computer-usable data storage medium of claim 13, wherein encoding the first and second portions of the source audiovisual data is performed according to an MPEG standard.

15. The non-transitory computer-usable data storage medium of claim 13, wherein the client device comprises at least one of a television set top box, a television, a personal computer, a tablet computer, a smartphone, and an optical disc player.

16. The non-transitory computer-usable data storage medium of claim 13, wherein the unmanaged, buffered data network includes at least one of a cable data network, a broadcast wireless data network, a point-to-point wireless data network, a satellite network, and a portion of the Internet.

17. The non-transitory computer-usable data storage medium of claim 13, wherein the unmanaged, buffered data network is coupled to a managed data network that is capable of providing interactive television signals.

18. The non-transitory computer-usable data storage medium of claim 13, wherein the program code for transmitting the first and second portions of transmission audiovisual data includes program code for dividing the data of each video frame into at least one frame portion, the medium further comprising:

program code for waiting to receive, from the client device, for each frame portion, an acknowledgement that the frame portion has been received by the client device, wherein the delay cost function is calculated using a length of time between the completion of the encoding of a frame portion and receipt from the client device of the acknowledgement of the frame portion.

19. The non-transitory computer-usable data storage medium of claim 13, wherein transmitting the first and second portions of transmission audiovisual data is performed in accordance with the Transmission Control Protocol (hereinafter "TCP"), further comprising program code for calculating an estimated available bandwidth as $$\text{estimate} = 8*\text{mss}*\text{cwnd}/\text{rtt},$$

where "mss" is a TCP Maximum Segment Size, "cwnd" is a TCP Congestion Window Size, and "rtt" is a round trip time associated with the data network; and for establishing the second encoding bitrate as being equal to the value of the ratio of "estimate" to the delay cost function, and wherein altering the encoding of the source audiovisual data includes encoding the source audiovisual data using the established encoding bitrate.

20. The non-transitory computer-usable data storage medium of claim 13, wherein transmitting the first and second portions of transmission audiovisual data is performed in accordance with the Transmission Control Protocol (hereinafter "TCP"), further comprising program code for calculating an estimated available bandwidth as $$\text{estimate} = 8*\text{mss}*\text{cwnd}/\text{rtt},$$

where "mss" is a TCP Maximum Segment Size, "cwnd" is a TCP Congestion Window Size, and "rtt" is a round trip time associated with the data network; and for establishing the second encoding bitrate as being equal to the value of the ratio of "estimate" to the delay cost function; wherein the source audiovisual data includes source audio data having an audio bitrate and source video frames having a video encoding bitrate, and the altering includes altering the video encoding bitrate so that the sum of the audio bitrate and the video encoding bitrate is no greater than the second encoding bitrate.

21. The non-transitory computer-usable data storage medium of claim 13, wherein the source audiovisual data are generated by an interactive software application according to encoding bitrates including the first and second encoding bitrates, the medium further comprising program code for notifying the application of the altering.

22. The non-transitory computer-usable data storage medium of claim 21, wherein, when the second encoding bitrate is lower than a given threshold defined by the application, the application alters the source audiovisual data by not generating a transparent screen object.

23. The non-transitory computer-usable data storage medium of claim 21, wherein the source audiovisual data include a graphical user interface, and wherein when the second encoding bitrate is lower than a given threshold defined by the application, the application alters the source audiovisual data by postponing the generation of a dynamic screen region in the graphical user interface.

24. The non-transitory computer-usable data storage medium of claim 13, further comprising program code for pausing the encoder when the value of the delay cost function falls below a given threshold.

25. A server system for controlling playback latency associated with transmission of source audiovisual data through an unmanaged, buffered data network to a client device, the server system comprising: an interactive application, executing on one or more computing devices, the interactive application being controlled by commands received from the client device to generate source audiovisual data;

an encoder for encoding the source audiovisual data into transmission audiovisual data according to an encoding bitrate; a transmission buffer for buffering the transmission audiovisual data;

a transmitter for transmitting the transmission audio data through the data network; and a delay cost module for calculating a delay cost function based on a delay associated with the buffering and with network delay, raised to a power, scaled by a scaling factor, and added to a minimum cost to transmit data, the delay cost module calculating the encoding bitrate based on the delay cost function and providing the encoding bitrate to the encoder.

26. The server system of claim 25, wherein the client device comprises at least one of a television set top box, a television, a personal computer, a tablet computer, a smartphone, and an optical disc player.

27. The server system of claim 25, wherein the unmanaged, buffered data network includes at least one of a cable data network, a broadcast wireless data network, a point-to-point wireless data network, a satellite network, and a portion of the Internet.

28. The server system of claim 25, wherein the unmanaged, buffered data network is coupled to a managed data network that is capable of providing interactive television signals.

\* \* \* \* \*

UNITED STATES PATENT AND TRADEMARK OFFICE
CERTIFICATE OF CORRECTION

PATENT NO. : 9,204,203 B2
APPLICATION NO. : 13/438617
DATED : December 1, 2015
INVENTOR(S) : Brockmann et al.

Page 1 of 1

It is certified that error appears in the above-identified patent and that said Letters Patent is hereby corrected as shown below:

In the claims,

Claim 13, col. 19, lines 4-5, please delete "transmit data a network latency associated with the data;" and insert --transmit data;--;

Claim 19, col. 19, lines 60-63, please delete "delay cost function, and wherein altering the encoding of the source audiovisual data includes encoding the source audiovisual data using the established encoding bitrate." and insert --delay cost function.--.

Signed and Sealed this
Fifth Day of April, 2016

Michelle K. Lee
*Director of the United States Patent and Trademark Office*